(12) United States Patent  (10) Patent No.: US 8,480,299 B2
Thompson  (45) Date of Patent: Jul. 9, 2013

(54) MULTI-STAGE TEMPERATURE INDICATING DEVICE

(75) Inventor: Gary M. Thompson, Turlock, CA (US)

(73) Assignee: Volk Enterprises, Inc., Turlock, CA (US)

( * ) Notice: Subject to any disclaimer, the term of this patent is extended or adjusted under 35 U.S.C. 154(b) by 0 days.

(21) Appl. No.: 13/319,601

(22) PCT Filed: Oct. 29, 2010

(86) PCT No.: PCT/US2010/054632
§ 371 (c)(1),
(2), (4) Date: Dec. 23, 2011

(87) PCT Pub. No.: WO2012/047241
PCT Pub. Date: Apr. 12, 2012

(65) Prior Publication Data
US 2012/0201270 A1  Aug. 9, 2012

Related U.S. Application Data

(60) Provisional application No. 61/256,627, filed on Oct. 30, 2009.

(51) Int. Cl.
*G01K 1/08* (2006.01)
*G01K 1/14* (2006.01)
*G01K 13/00* (2006.01)
*G01K 11/00* (2006.01)
*G01K 1/02* (2006.01)

(52) U.S. Cl.
USPC ............................. 374/155; 116/216; 116/218

(58) Field of Classification Search
USPC ............................. 374/160, 155; 116/218, 216
See application file for complete search history.

(56) References Cited

U.S. PATENT DOCUMENTS

| | | | | |
|---|---|---|---|---|
| 4,356,790 A | * | 11/1982 | Gee | 116/218 |
| 4,421,053 A | * | 12/1983 | Volk | 116/218 |
| 4,748,931 A | * | 6/1988 | Volk | 116/218 |
| 5,799,606 A | * | 9/1998 | Volk et al. | 116/218 |
| 7,204,199 B2 | * | 4/2007 | Ribi et al. | 116/218 |
| 2009/0092519 A1 | * | 4/2009 | Stewart et al. | 422/82.12 |

* cited by examiner

*Primary Examiner* — Lisa Caputo
*Assistant Examiner* — Jamel Williams
(74) *Attorney, Agent, or Firm* — Laurence P. Colton; Smith Risley Tempel Santos LLC

(57) ABSTRACT

A multi-stage temperature indicating device having a housing having a bore formed therein having a closed end and an open end, the housing having a first neck region spaced from the closed end, a first internal cavity between the first neck region and the closed end, a second internal cavity between the first neck region and the open end; an indicator rod comprising a first stem stretch and a second stem stretch; an extension segment having a first extension stretch and a second extension stretch, the second extension stretch slidably cooperating with the first stem stretch; the indicator rod and the extension segment slidably positioned in the bore; and a fusible material retaining the indicator rod and the extension segment in the housing, wherein different portions of the fusible material soften at different predetermined temperatures, whereby upon the softening of a first portion of the fusible material allows a spring to urge the indicator rod a first distance out of the housing indicating that a first temperature has been reached and upon the softening of a second portion of the fusible material allows the spring to urge the indicator rod a second distance out of the housing indicating that a second temperature has been reached.

30 Claims, 16 Drawing Sheets

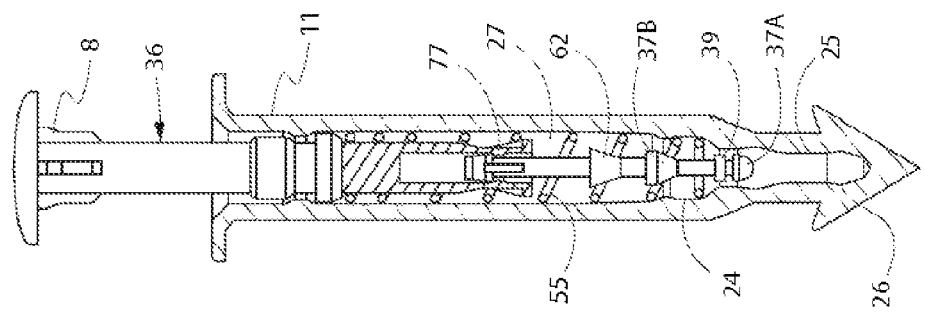
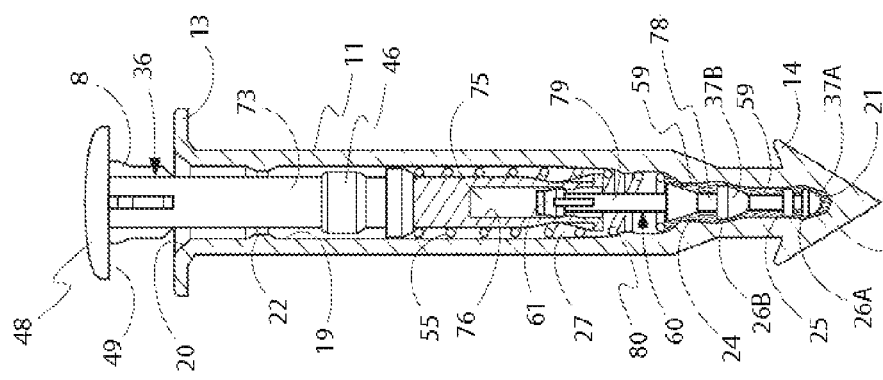
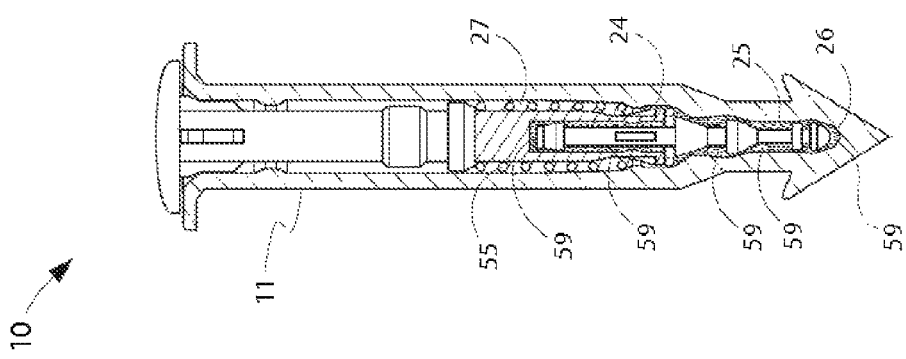
Fig. 16

MULTI-STAGE TEMPERATURE INDICATING DEVICE

BACKGROUND OF THE INVENTION

1. Technical Field

This invention relates in general to a temperature indicating device providing a visual indication of when a certain temperature has been reached and, more particularly, to a multi-stage multi-temperature temperature indicating device for use in cooking foods providing a visual indication of specific multiple temperatures, when a first temperature has been reached and then when a second temperature has been reached, or as a pre-indicator that the end point temperature will be reached within a specific time.

2. Prior Art

Temperature indicating devices are known and have been used for measuring internal temperatures when cooking meat, poultry and the like. Such temperature indicating devices typically include a barrel-shaped housing and an indicator rod retained in the barrel by a fusible material. When a predetermined temperature is reached, the fusible material softens, releasing the indicator rod from the barrel to provide a visual indication that the product is fully cooked. With the temperature indicating device, a consumer may safely prepare meat or poultry without overcooking the product. U.S. Pat. Nos. 4,748,931, 5,799,606, and 5,988,102 disclose representative examples of such temperature indicating devices.

To ensure the temperature indicating device provides a reliable, accurate indication of the internal temperature of the product, the fusible material must securely retain the indicator rod within the housing until the temperature indicating device has been heated to a predetermined temperature. Most current temperature indicating devices indicate only one temperature, namely the temperature at which the temperature indicating device is designed to activate. However, devices that can indicate two temperatures are known, and U.S. Pat. No. 4,421,053 discloses such a temperature indicating device that indicates two temperatures.

There has been a very high interest in the cooking industry for a temperature indicating device that communicates cooking progression. For example, it would be advantageous for cooks to know approximately when the main course (the turkey or the roast beef, for example) will be ready. Thus, such a device could indicate approximately when the main course will be ready by giving a first indication at a first approximate temperature (or approximate time prior to final activation), allowing the cook time to prepare other dishes for the meal. This device could assist the cook in knowing when the device is going to activate indicating that the food is done cooking. This device also could indicate when a first temperature has been reached and then indicate when a second, higher, temperature has been reached, such that the cook is informed that there is a certain limited time period before the food is thoroughly cooked. This device further could assist cooks in knowing when the more difficult "medium" (as opposed to rare or well-done) temperatures have been reached. However, to date, the industry has not been able to provide a satisfactory disposable temperature indicating device with precise multiple temperature indications. The present invention is meant to address these needs for a disposable precision multiple temperature indicating device.

BRIEF SUMMARY OF THE INVENTION

Briefly, the present invention is a multi-stage multi-temperature temperature indicating device for use in providing an indication to the user when at least two temperatures have been reached, such as a first (intermediate) temperature and a second (final) temperature that is higher than the first temperature. Another embodiment of the invention is a multi-stage temperature indicating device for use in providing an indication to the user when at least three temperatures have been reached, such as a first (intermediate) temperature, a second (intermediate) temperature that is higher than the first temperature, and a third (final) temperature that is higher than the second temperature. Additional embodiments for indicating four or more temperatures also are contemplated. This multi-stage temperature indicating device is particularly suitable for determining the internal temperature of meat, poultry or other products, and the progression of the internal temperature as cooking progresses.

The temperature indicating device generally includes an elongate housing formed with a longitudinally extending bore, an indicator rod, and at least one extension segment. The indicator rod and the extension segment(s) sometimes are referred to in combination as the stem. In one embodiment of the invention, the indicator rod and the extension segment(s) are slidably snapped together and slidably inserted into the housing. The interior of the housing can include at least two sections or cavities, with the first internal section or cavity for accommodating an end of the extension segment(s) and a second section or cavity for accommodating the indicator rod. The second internal section or cavity also can have a lower portion, proximal to the first internal section or cavity, for accommodating a flanged portion of the indicator rod. The indicator rod and the extension segment(s) are slidably disposed within the bore formed in the housing.

In one embodiment, the indicator rod includes a first stem stretch and a second stem stretch. The first stem stretch is a generally hollow cylindrical structure for accommodating at least a portion of the extension segment and the second stem stretch is a generally solid cylindrical structure. The extension segment is a generally cylindrical rod having an enlarged front end portion, an enlarged rear end portion, and optionally a centrally located stop. The extension segment is snapped into the hollow interior of the first stem stretch, with the enlarged rear end portion cooperating with an interior stop located on the interior surface of the hollow interior of the first stem stretch to prevent the extension segment from fully disengaging from the first stem stretch. When the indicator rod with the extension segment is inserted into the housing, the enlarged front end of the extension segment is positioned in the first internal cavity while the first and second stem stretches are positioned in the second internal cavity. The temperature indicating device also includes means, such as a spring, for urging the indicator rod outwardly from the housing when activated.

In another embodiment, the indicator rod also includes a first stem stretch and a second stem stretch. Both the first stem stretch and the second stem stretch are generally solid cylindrical structures, with the first stem stretch having a smaller cross-section or diameter than the second stem stretch. The first stem stretch has an enlarged front end for cooperating with the extension segment. The extension segment in this embodiment includes a first extension stretch and a second extension stretch. The first extension stretch is a generally solid cylindrical structure having a smaller cross-section or diameter than the second extension stretch and further having an enlarged front end. The second extension stretch is a generally hollow cylindrical structure for accommodating the enlarged front end of the first stem stretch of the indicator rod. When the indicator rod and the extension segment are inserted into the housing, the enlarged front end of the extension segment is positioned in the first internal cavity, the enlarged front end of the indicator rod is positioned in the hollow interior of the second extension stretch, and the second extension stretch and the first and second stem stretches are positioned in the second internal cavity. The temperature indicating device also includes means, such as a spring, for urging the indicator rod outwardly from the housing when activated.

In other embodiments, there can be two or more extension segments so as to provide for two or more intermediate temperature indications.

A fusible material that is solid under normal conditions and that softens at a predetermined elevated temperature substantially fills the first internal cavity. The fusible material also substantially fill the lower portion of the second internal cavity and/or at least a portion of the hollow interior of the first stem stretch or the hollow interior of the second extension stretch, depending on the embodiment. In other embodiments, such as embodiments indicating three or more temperatures, additional amounts of the fusible material are used in various other cavities and hollow interiors. The fusible material engages at least the enlarged front end portion of the extension segment to retain the extension segment in the first cavity and, depending on the embodiment, and either engages the flanged portion of the indicator rod to retain the indicator rod in the lower portion of the second internal cavity, engages the enlarged rear portion of the extension segment to retain the extension segment in the first stem stretch, and/or engages the enlarged front end of the indicator rod to retain the indicator rod in the second extension stretch, thus retaining the rod in the housing. Preferably, the fusible material substantially fills each cavity.

At least one type of the fusible material is used. If two or more types of fusible material are used, then each type may soften at a different temperature. For example, one type of fusible material may soften at a first, lower, temperature, and another type of fusible material may soften at a second, higher, temperature. Thus, when the first type of fusible material softens, the indicator rod can move out of the housing a first distance indicating that a first, lower, temperature has been reached, and when the second type of fusible material softens, the indicator rod can move out of the housing a second distance indicating that a second, higher temperature has been reached. In other words, the indicator rod, which is biased by the spring, can be urged or released into a first partially extended position upon attainment of a specified temperature, and then into a second fully extended position upon attainment of an additional specified temperature. This multi-stage process first gives a visual indication to the user that a first temperature has been reached, informing the user that the second temperature will be reached in a matter of time, and then second give a visual indication to the user that the product has reached an acceptable temperature level and doneness.

Thus, the present invention is a temperature indicating device comprising a segmented stem that gives a visual indication of specific multiple temperatures, or that can give a pre-indication that the end point temperature will be reached within a specific time. When used in connection with food, the invention can be a disposable meat temperature indicating device that gives a first visual indication to the user that the product will reach an acceptable temperature level and doneness within a specific time period, at which time a second visual indication will be given. The device will also allow more than one end point temperature, so the user can choose which to use.

Other features, aspects, and advantages of the invention will become apparent from the following detailed description of the preferred embodiments, taken in conjunction with the accompanying drawings in which like reference numerals represent like components throughout the several views, illustrating by way of example the principles of the invention.

BRIEF DESCRIPTION OF THE DRAWINGS

FIG. 16 are cross sectional views of an alternative fourth embodiment of the present invention, with FIG. 16A being in the inactivated position, FIG. 16B being in the first activated position, and FIG. 16C being in the second activated position.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

This invention comprises a segmented stem or plunger that will allow a temperature indicator device to give a visual indication of specific multiple temperatures, or as a pre-indicator that the end point temperature will be reached within a specific time. Specifically, the device allows the temperature indicating device to give a visual indication to the user that the food product will reach an acceptable temperature level and doneness within a specific time period. The device also allows more than one end point temperature, so that the user can choose which temperature to use.

Figure 1:
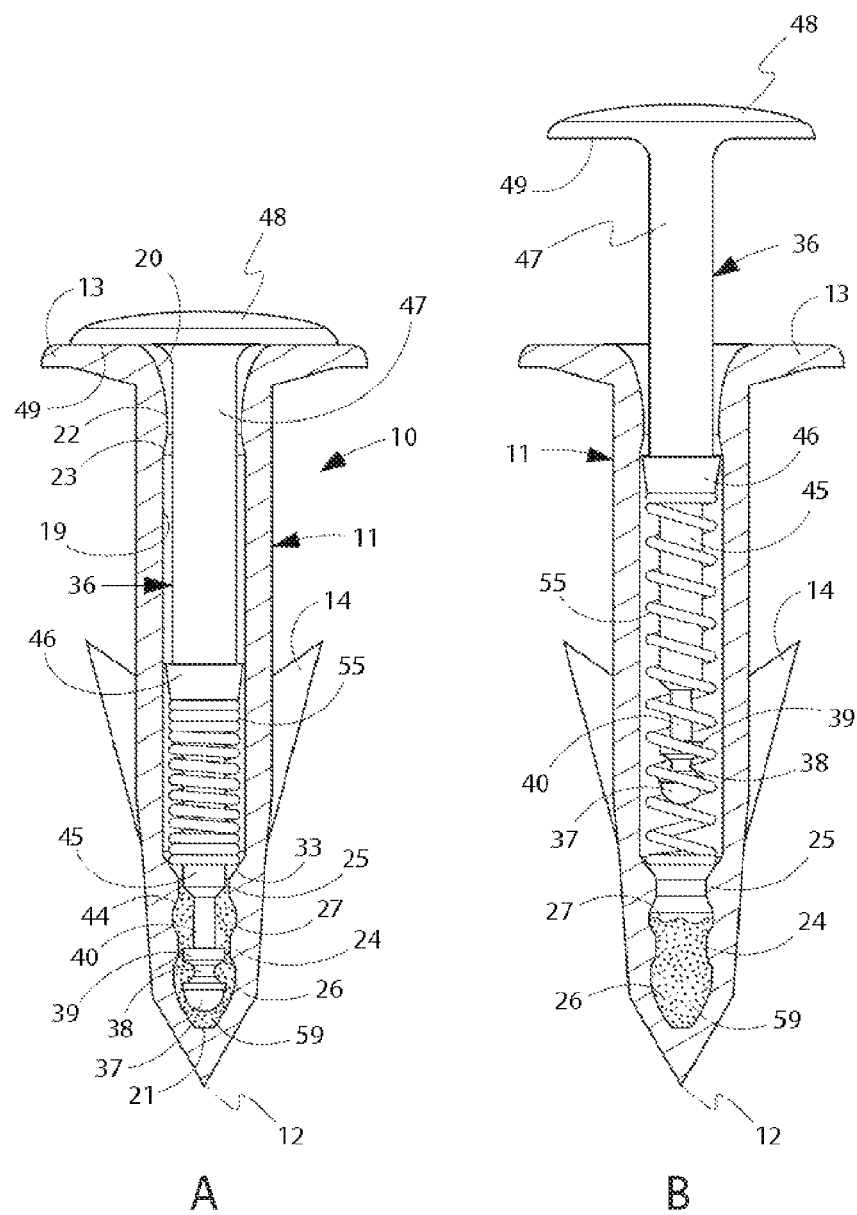
FIG. 1 are cross sectional views of a prior art temperature indicating device, with FIG. 1A being in the inactivated position and FIG. 1B being in the activated position.

FIG. 1 are cross sectional views of a prior art temperature indicating device, with FIG. 1A being in the inactivated position and FIG. 1B being in the activated position. This prior art temperature indicating device is now well-known in the art and can generally serve to provide a background for this class of device, to which the present invention generally belongs.

Figure 2:
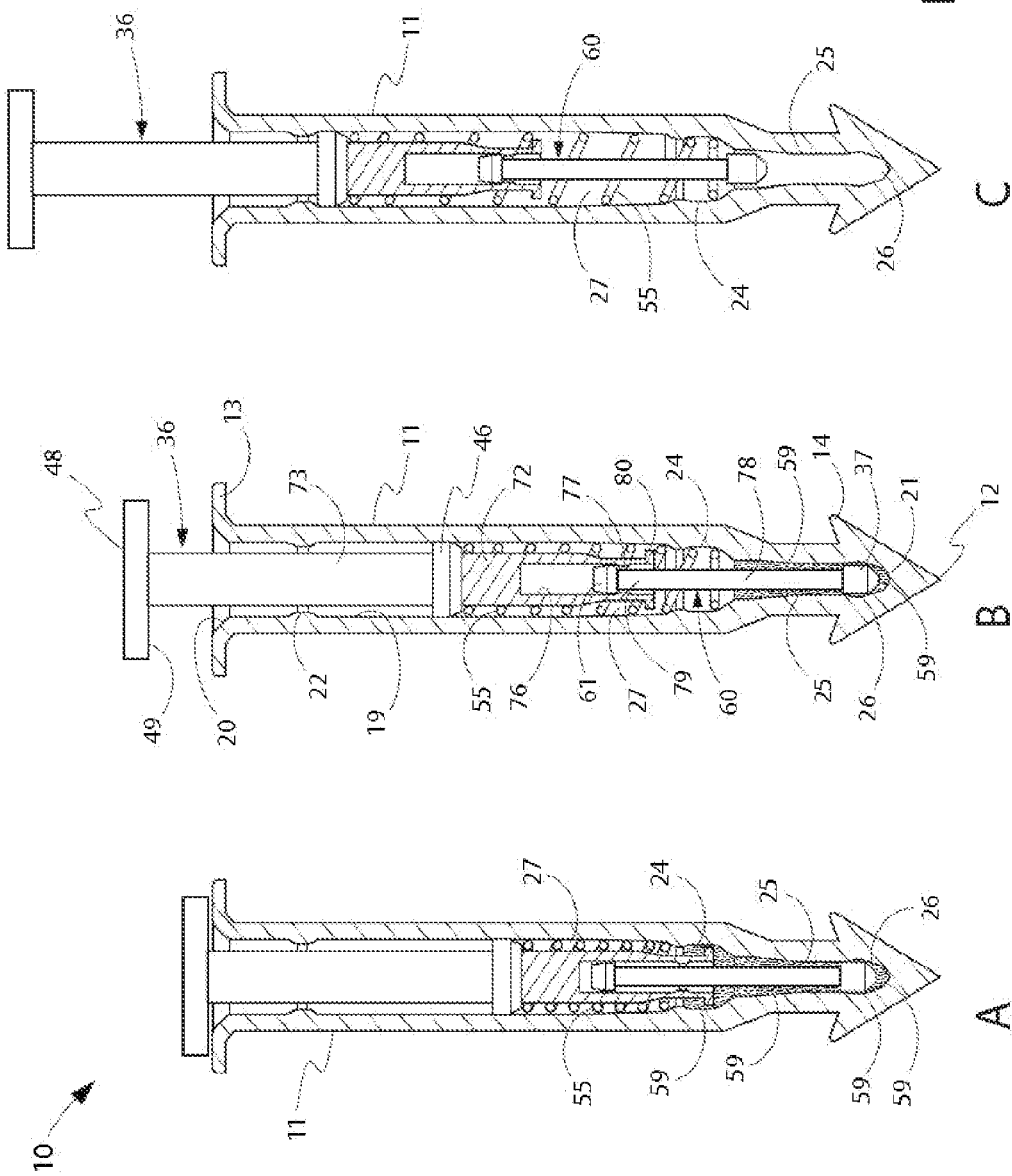
FIG. 2 are cross sectional views of a first embodiment of the present invention, with FIG. 2A being in the inactivated position, FIG. 2B being in the first activated position, and FIG. 2C being in the second activated position.
Figure 3:
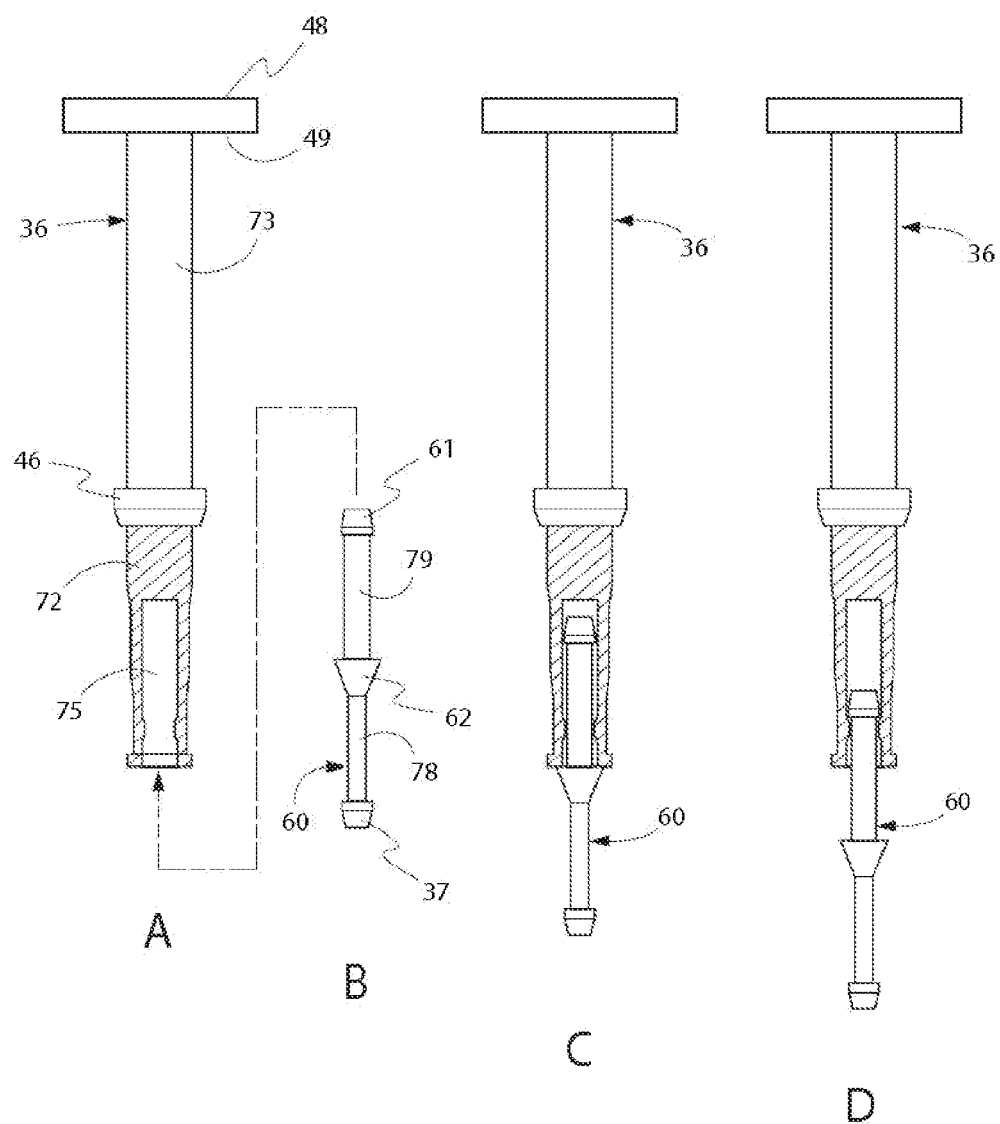
FIG. 3 are cross sectional views of the indicator rod and extension segment of the embodiment of the present invention shown in FIGS. 2 and 22, with FIG. 3A and FIG. 3B showing the connecting relationship between the indicator rod and the extension segment, FIG. 3C showing the inactivated position, and FIG. 3D showing an activated position.
Figure 15:
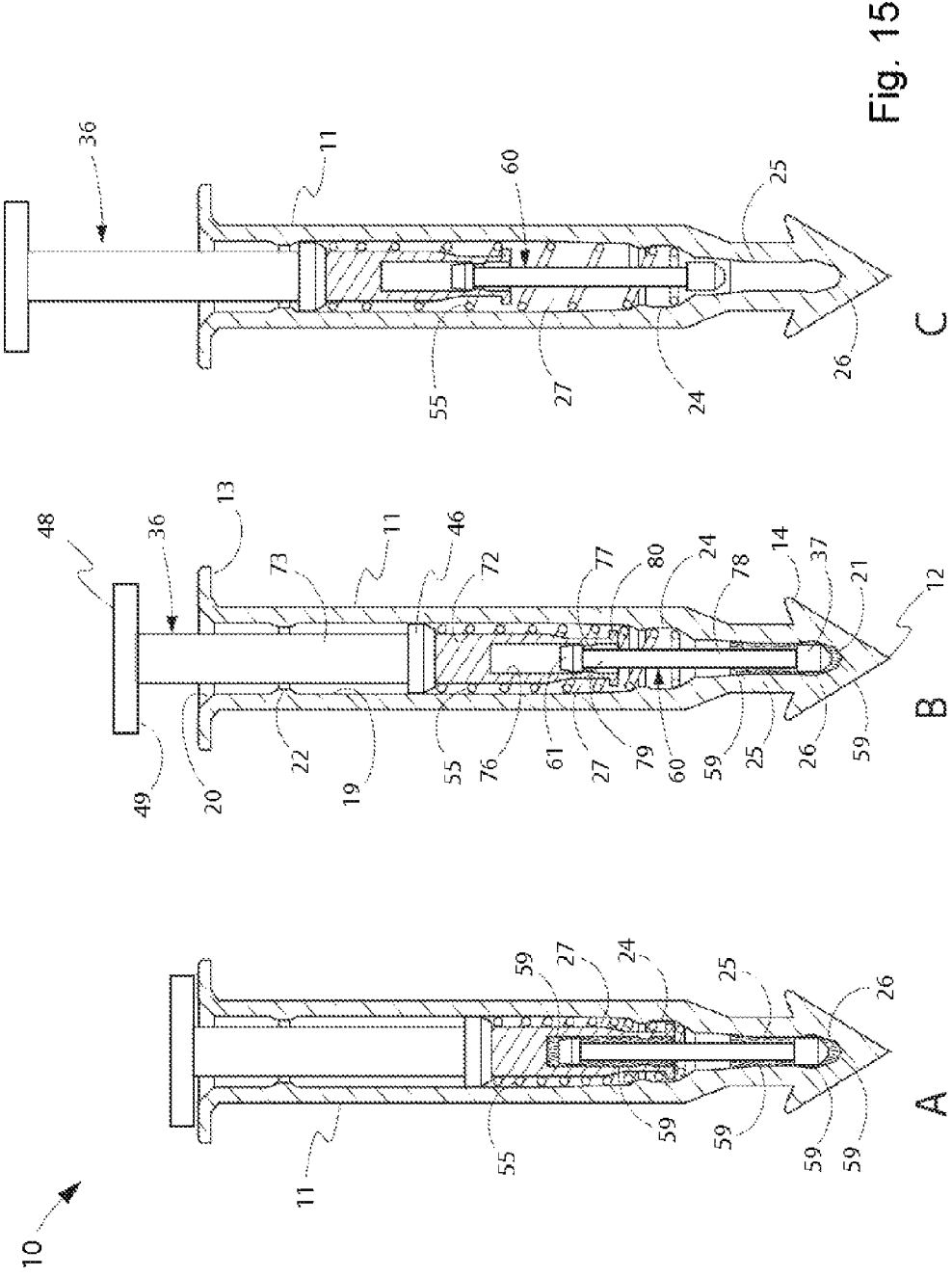
FIG. 15 are cross sectional views of an alternative second embodiment of the present invention, with FIG. 15A being in the inactivated position, FIG. 15B being in the first activated position, and FIG. 15C being in the second activated position.

FIGS. 2 and 15 are cross sectional views of first and second alternative embodiments of the present invention, with FIGS. 2A and 15A being in the inactivated position, FIGS. 2B and 15B being in the first activated position, and FIGS. 2C and 15C being in the second activated position. FIG. 3 are cross sectional views of the indicator rod and extension segment of the embodiment of the present invention shown in FIGS. 2 and 15, with FIG. 3A and FIG. 3B showing the connecting relationship between the indicator rod and the extension segment, FIG. 3C showing the inactivated position, and FIG. 3D showing an activated position. These views represent a relatively simple embodiment of the present invention.

Figure 4:
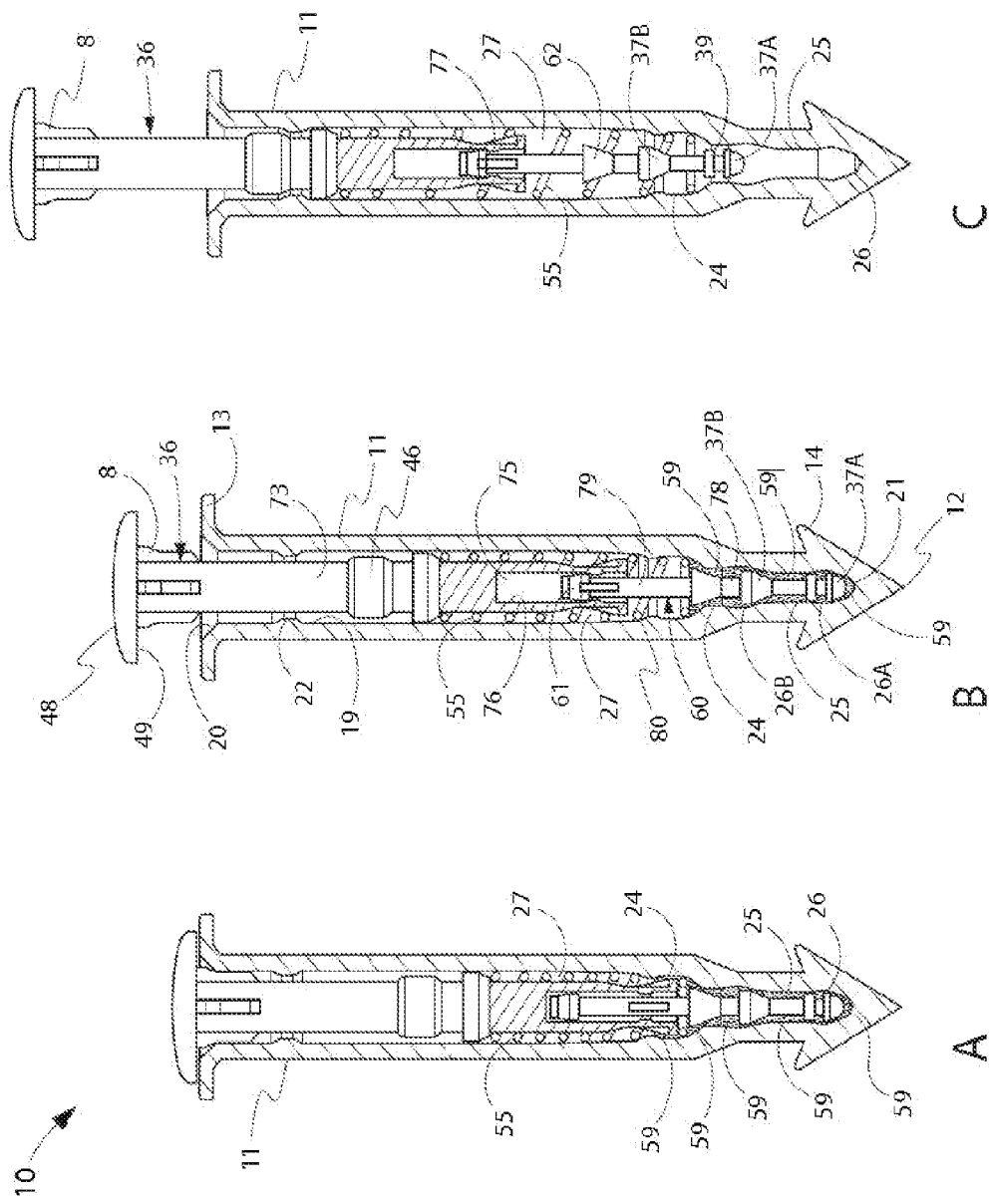
FIG. 4 are cross sectional views of a third embodiment of the present invention, with FIG. 4A being in the inactivated position, FIG. 4B being in the first activated position, and FIG. 4C being in the second activated position.
Figure 5:
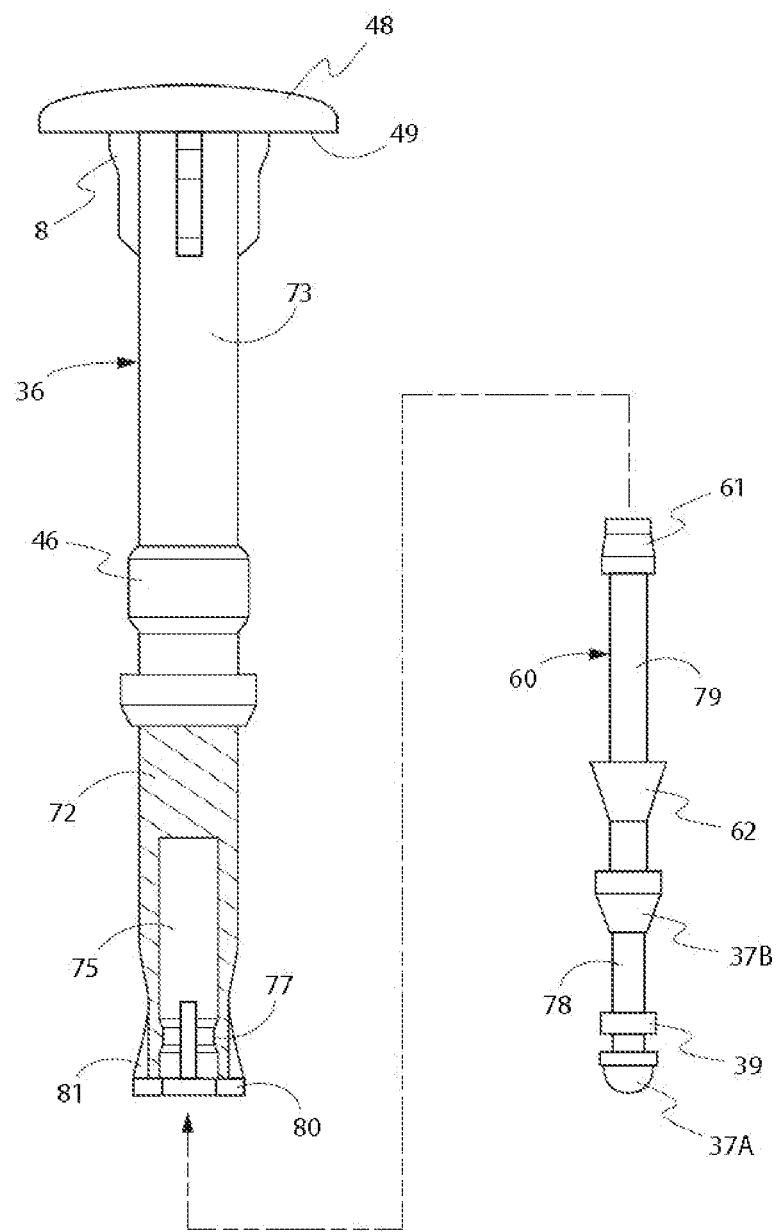
FIG. 5 are cross sectional views of the indicator rod and extension segment of the embodiment of the present invention shown in FIGS. 4 and 44, with FIG. 5A and FIG. 5B showing the connecting relationship between the indicator rod and the extension segment.

FIGS. 4 and 16 are cross sectional views of third and fourth alternative embodiments of the present invention, with FIGS. 4A and 16A being in the inactivated position, FIGS. 4B and 16B being in the first activated position, and FIGS. 4C and 16C being in the second activated position. FIG. 5 are cross sectional views of the indicator rod and extension segment of the embodiment of the present invention shown in FIGS. 4 and 16, with FIG. 5A and FIG. 5B showing the connecting relationship between the indicator rod and the extension segment. These views represent an embodiment of the present invention that can help prevent indicator rod creep due to premature softening of the fusible material.

Figure 6:
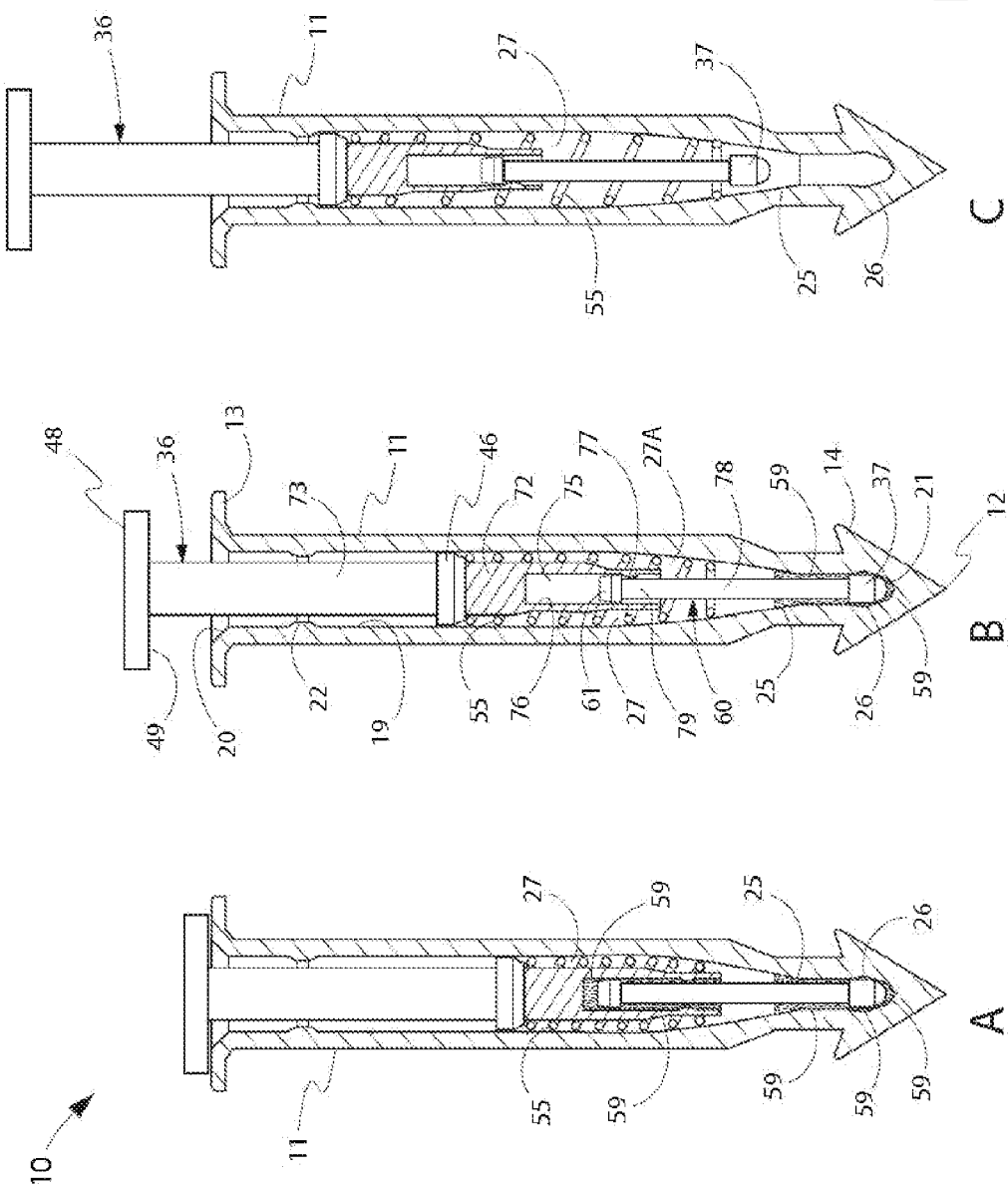
FIG. 6 are cross sectional views of a fifth embodiment of the present invention, with FIG. 6A being in the inactivated position, FIG. 6B being in the first activated position, and FIG. 6C being in the second activated position.
Figure 7:
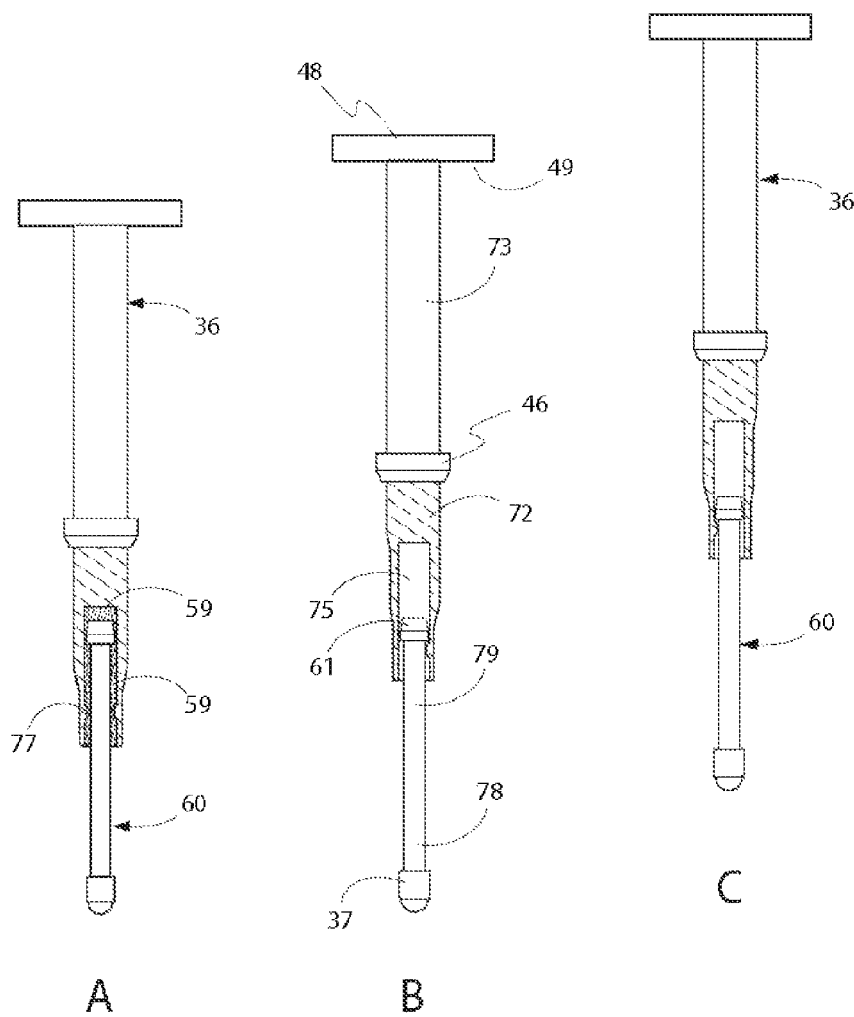
FIG. 7 are cross sectional views of the indicator rod and extension segment of the embodiment of the present invention shown in FIG. 6, with FIG. 7A being in the inactivated position, FIG. 7B being in the first activated position, and FIG. 7C representing the second activated position.

FIG. 6 are cross sectional views of a fifth embodiment of the present invention, with FIG. 6A being in the inactivated position, FIG. 6B being in the first activated position, and FIG. 6C being in the second activated position. FIG. 7 are cross sectional views of the indicator rod and extension segment of the embodiment of the present invention shown in FIG. 6, with FIG. 7A being in the inactivated position, FIG. 7B being in the first activated position, and FIG. 7C representing the second activated position. These views represent a simple embodiment of the invention without an external stop on the extension segment.

Figure 8:
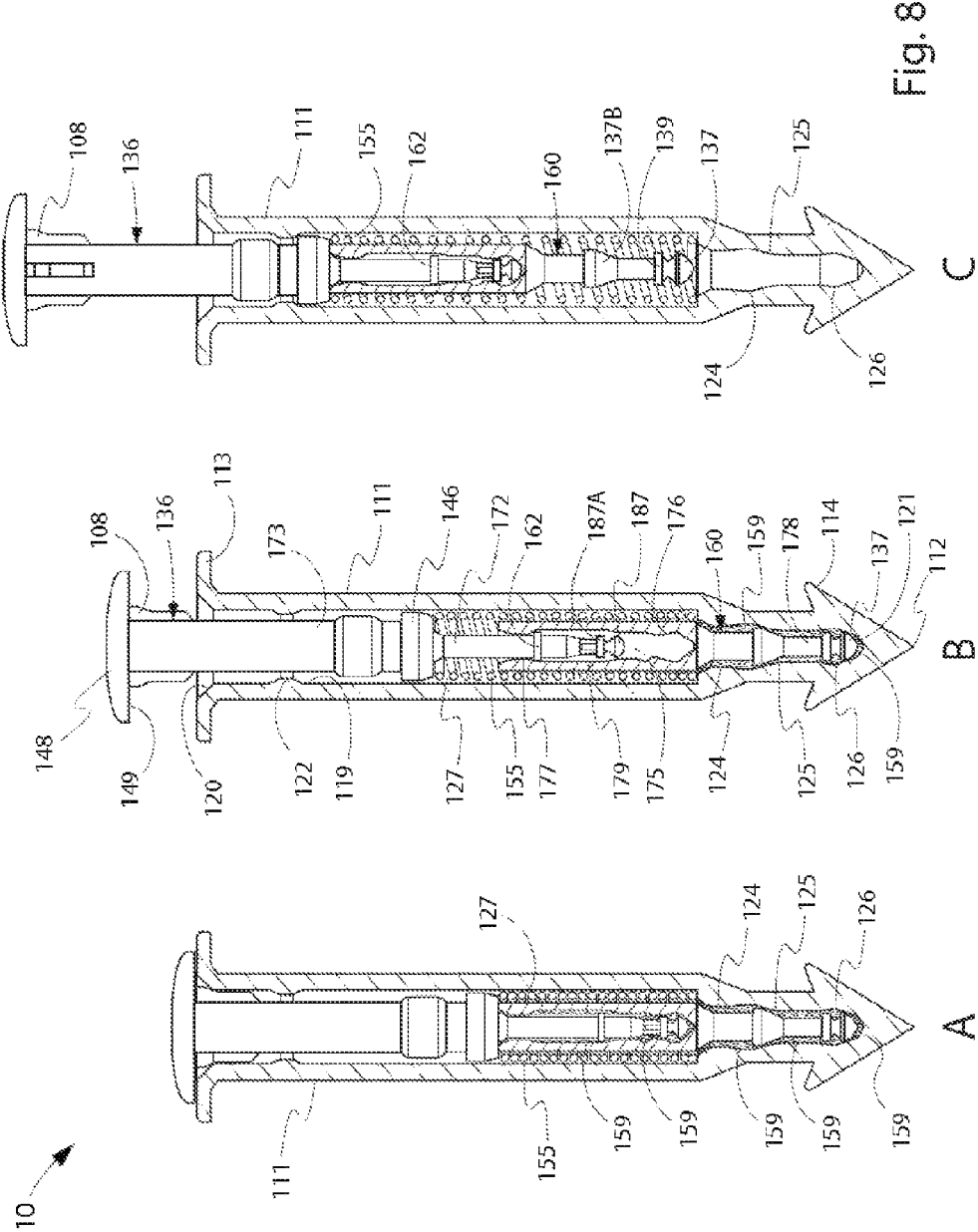
FIG. 8 are cross sectional views of a sixth embodiment of the present invention, with FIG. 8A being in the inactivated position, FIG. 8B being in the first activated position, and FIG. 8C being in the second activated position.
Figure 9:
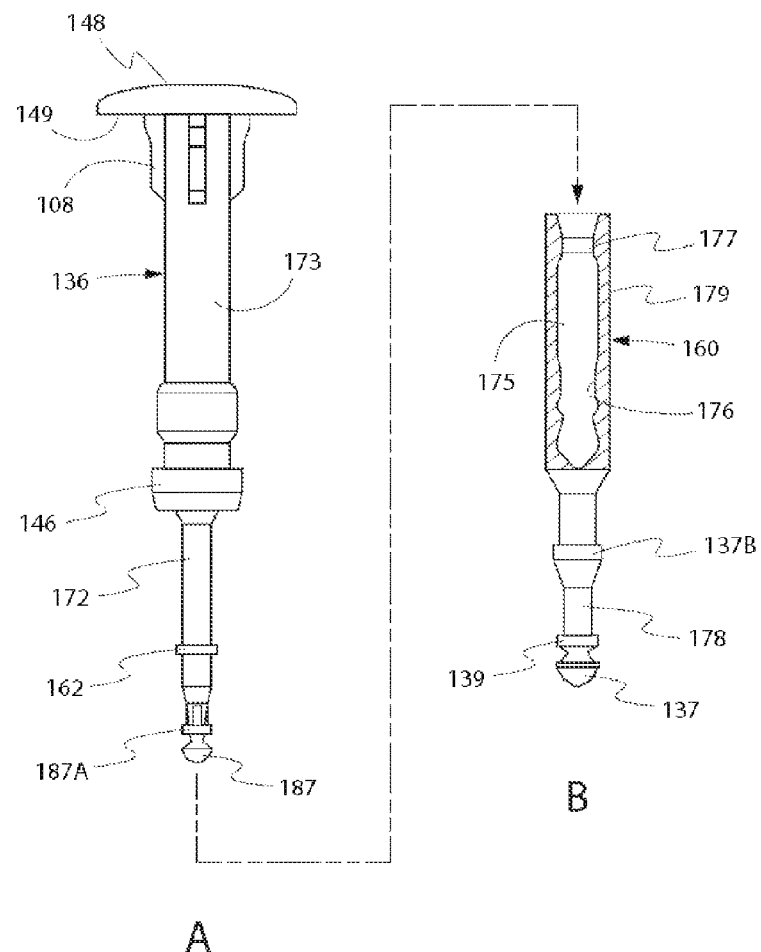
FIG. 9 are cross sectional views of the indicator rod and extension segment of the embodiment of the present invention shown in FIG. 8, with FIG. 9A and FIG. 9B showing the connecting relationship between the indicator rod and the extension segment.

FIG. 8 are cross sectional views of a sixth embodiment of the present invention, with FIG. 8A being in the inactivated position, FIG. 8B being in the first activated position, and FIG. 8C being in the second activated position. FIG. 9 are cross sectional views of the indicator rod and extension segment of the embodiment of the present invention shown in FIG. 8, with FIG. 9A and FIG. 9B showing the connecting relationship between the indicator rod and the extension segment. These views represent an embodiment of the invention in which the extension segment has a stretch with a hollow interior rather than the indicator rod having the stretch with the hollow interior.

Figure 10:
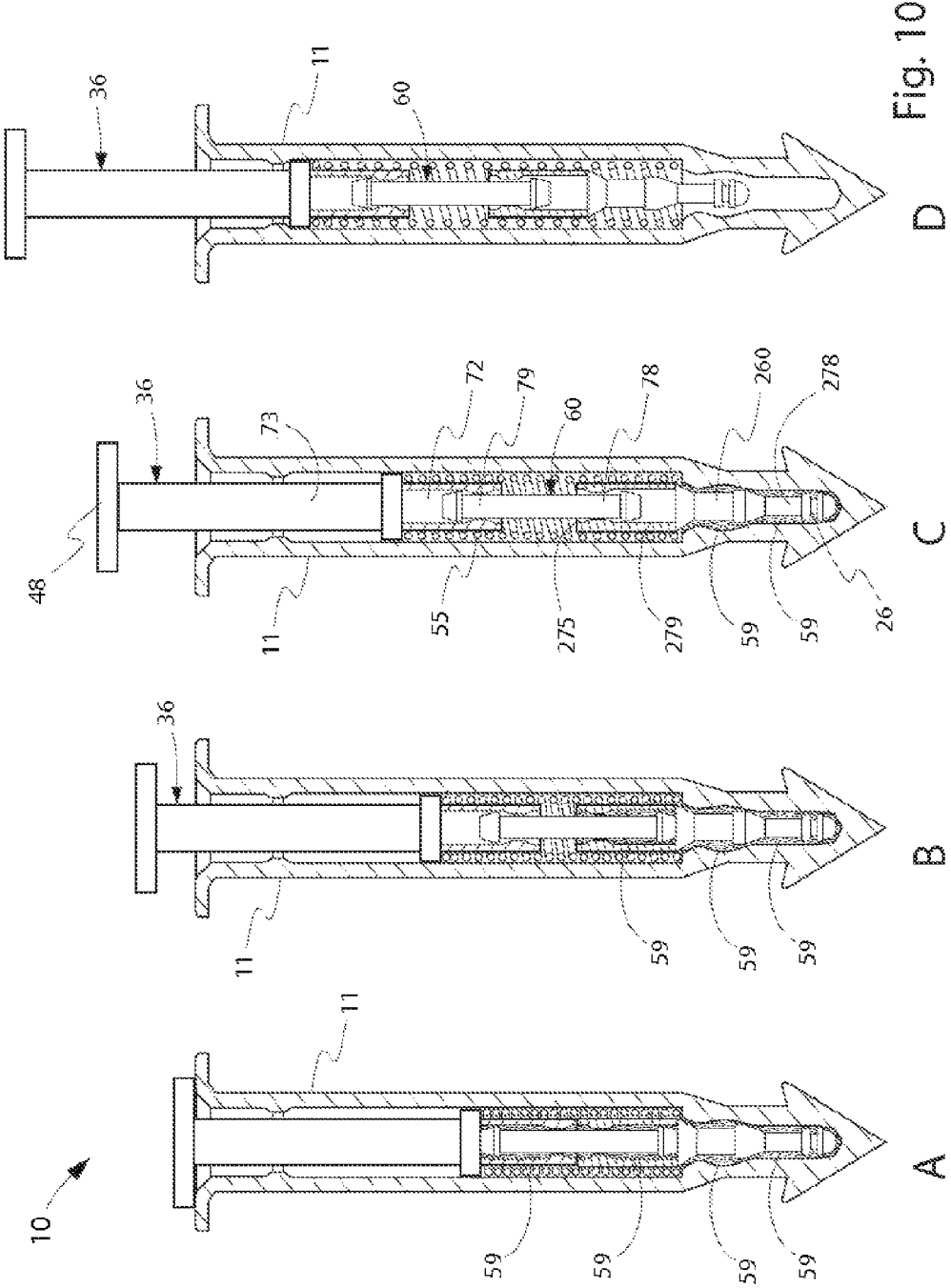
FIG. 10 are cross sectional views of a seventh embodiment of the present invention, with FIG. 10A being in the inactivated position, FIG. 10B being in the first activated position, FIG. 10C being in the second activated position, and FIG. 10D being in the third activated position.
Figure 11:
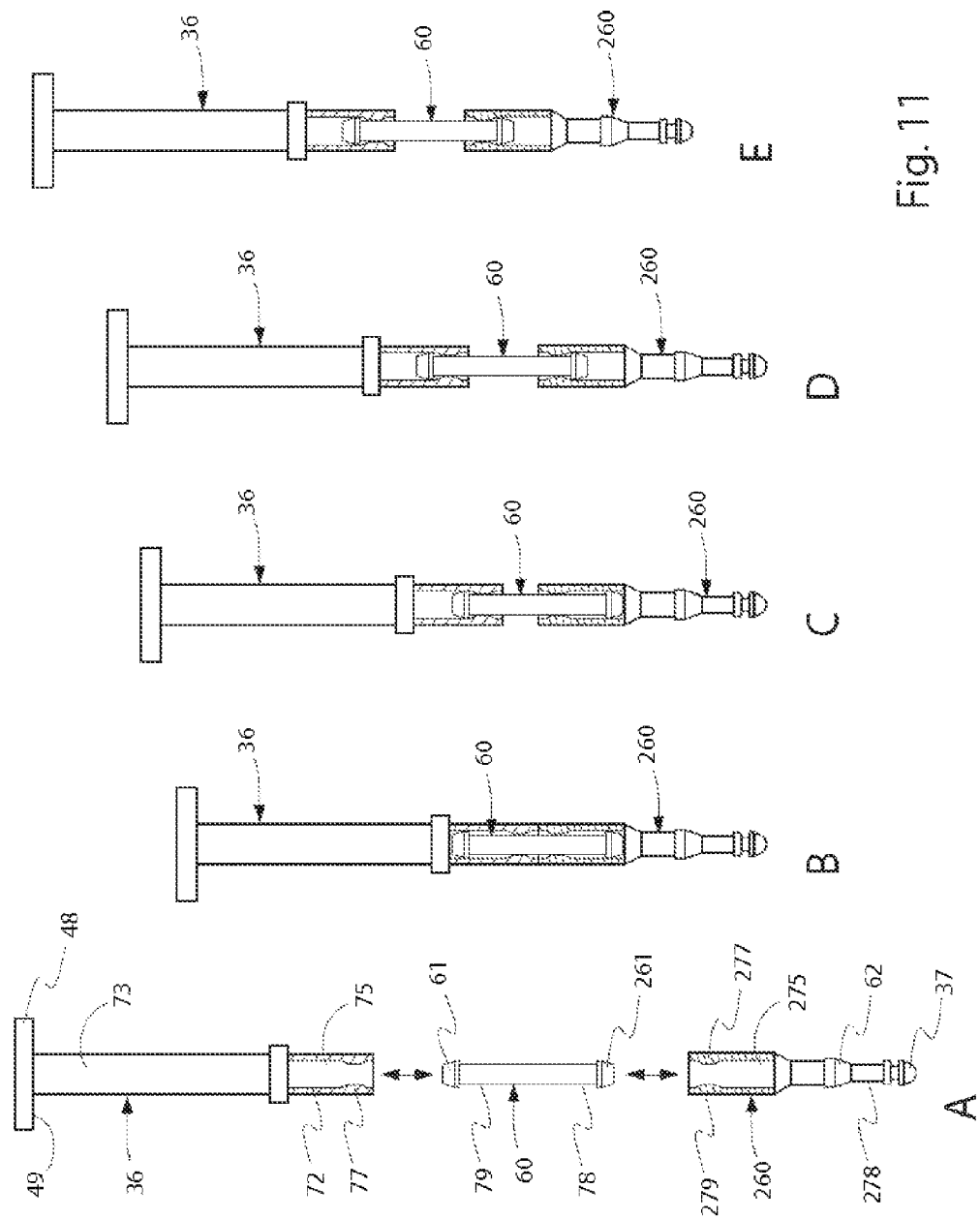
FIG. 11 are cross sectional views of the indicator rod and extension segment of the embodiment of the present invention shown in FIG. 10, with FIG. 11A showing the connecting relationship between the indicator rod and the extension segment, FIG. 11B being in the inactivated position, FIG. 11C being in the first activated position, FIG. 11D being in the second activated position, and FIG. 11E representing the third activated position.

FIG. 10 are cross sectional views of a seventh embodiment of the present invention, with FIG. 10A being in the inactivated position, FIG. 10B being in the first activated position, FIG. 10C being in the second activated position, and FIG. 10D being in the third activated position. FIG. 11 are cross sectional views of the indicator rod and extension segment of the embodiment of the present invention shown in FIG. 10, with FIG. 11A showing the connecting relationship between the indicator rod and the extension segment, FIG. 11B being in the inactivated position, FIG. 11C being in the first activated position, FIG. 11D being in the second activated position, and FIG. 11E representing the third activated position. These views represent an embodiment of the invention that can indicate two intermediate temperatures and a final temperature.

Figure 12:
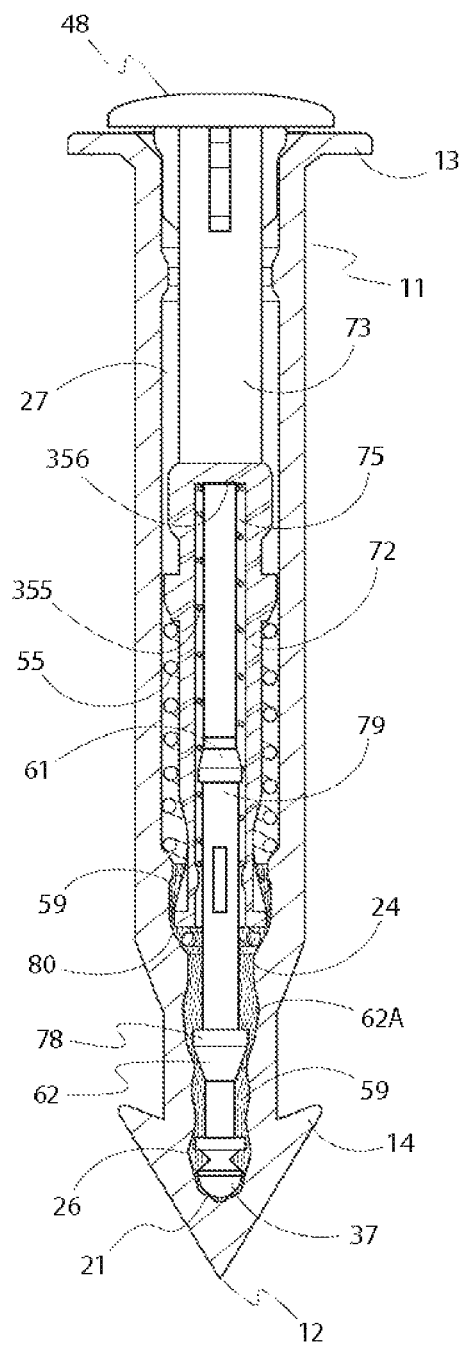
FIG. 12 is an enlarged cross sectional view of an eighth embodiment of the present invention with a second spring within the hollow interior of the first stem stretch of the indicator rod.

FIG. 12 is an enlarged cross sectional view of an eighth embodiment of the present invention with a second spring within the hollow interior of the first stem stretch of the indicator rod. This view represents an embodiment of the invention with additional urging components for urging the indicator rod out of the housing.

Figure 13:
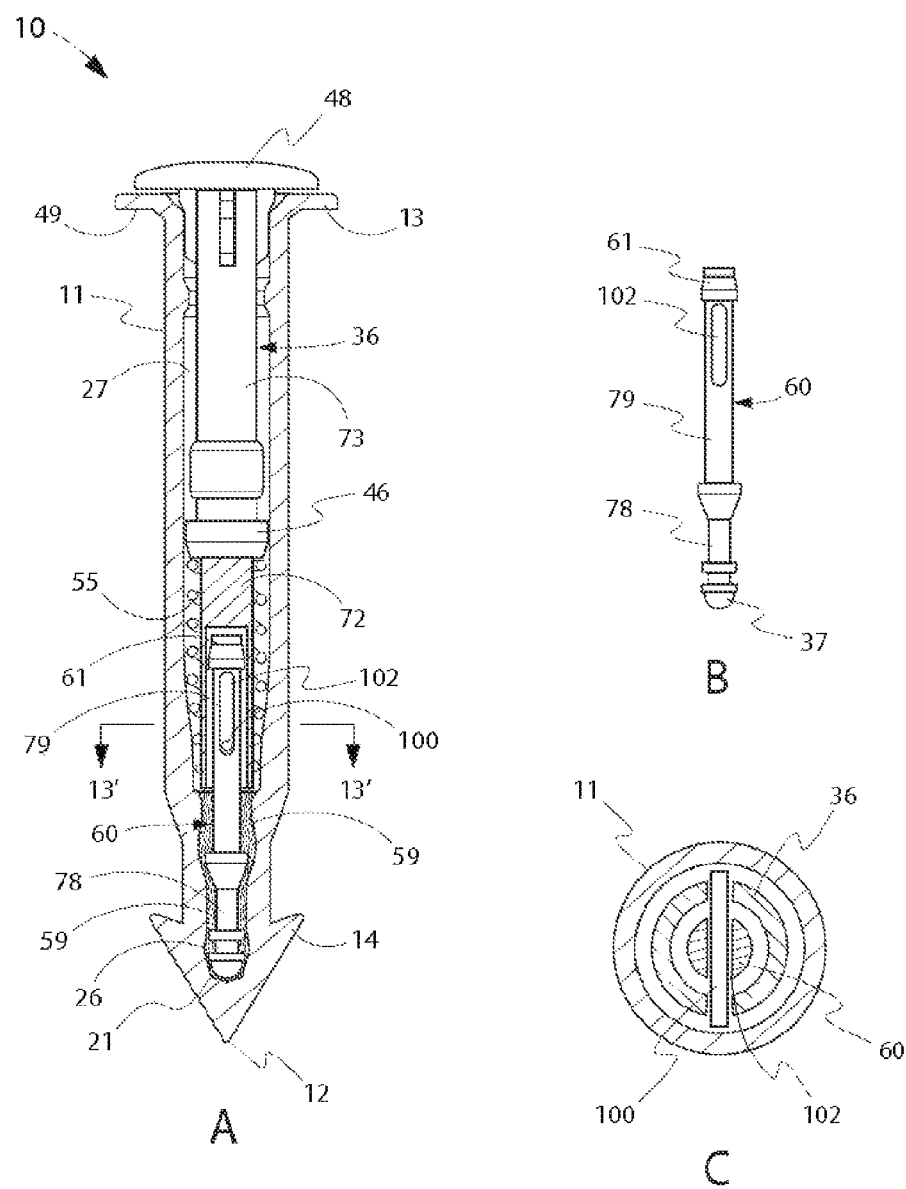
FIG. 13 are cross sectional views of a ninth embodiment of the present invention having a securing pin between the indicator rod and the extension segment, with FIG. 13A being the completed device, FIG. 13B being the extension segment, and FIG. 13C being a cross sectional view along line 13'-13' of FIG. 13A.

FIG. 13 are cross sectional views of a ninth embodiment of the present invention having a securing pin between the indicator rod and the extension segment, with FIG. 13A being the completed device, FIG. 13B being the extension segment, and FIG. 13C being a cross section along 13'-13'. These views represent an embodiment of the invention in which the extension segment is slidably secured to the indicator rod in an alternate manner, namely, a pin.

Figure 14:
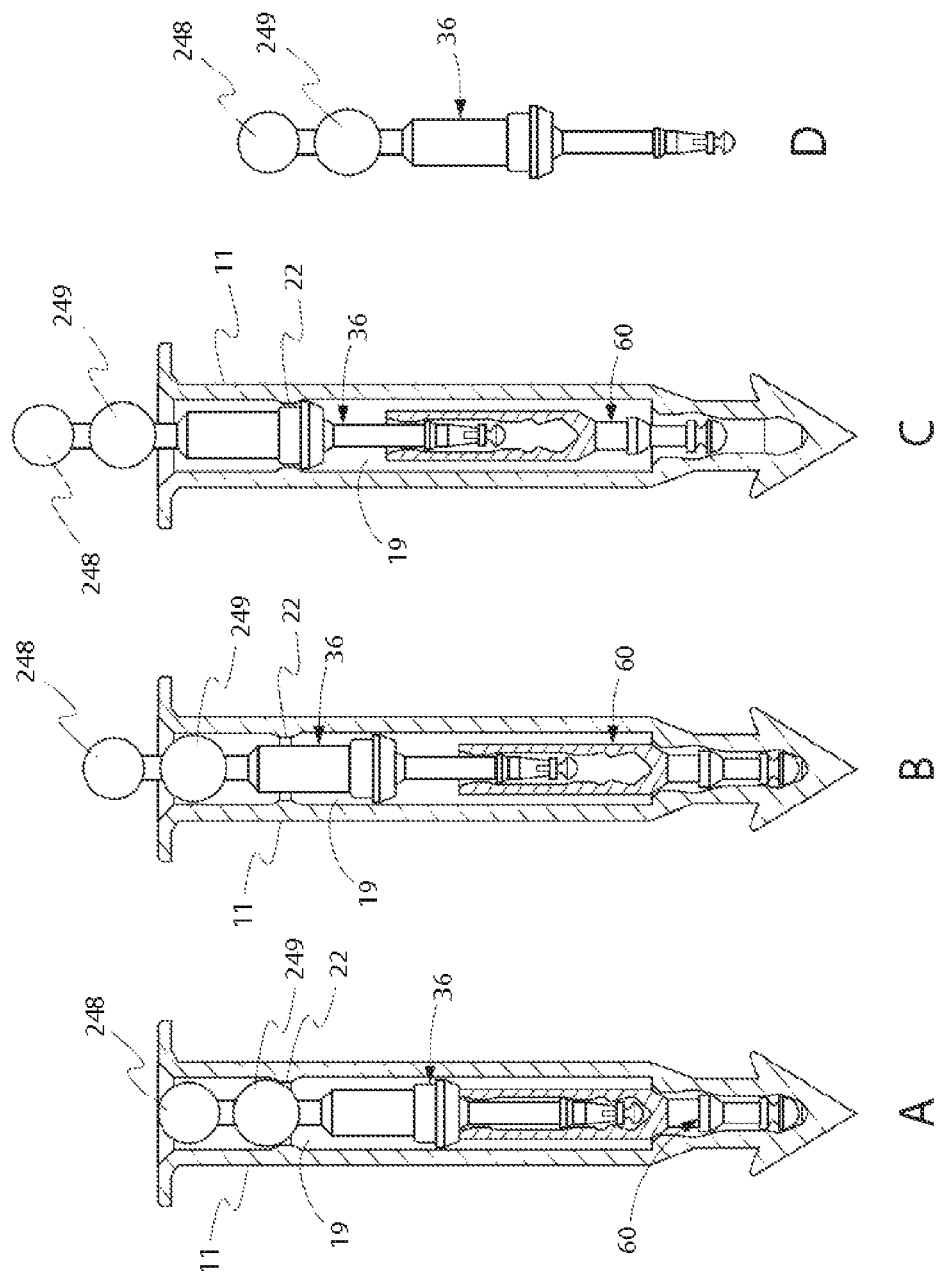
FIG. 14 are cross sectional views of a tenth embodiment of the present invention, with FIG. 14A being in the inactivated position, FIG. 14B being in the first activated position, FIG. 14C being in the second activated position, and FIG. 14D being of the extension segment.

FIG. 14 are cross sectional views of a tenth embodiment of the present invention replacing the indicating cap with two indicating balls to show the two indicating positions or temperatures. FIG. 14A shows the device in the inactivated position. FIG. 14B shows the device in the first activated position with one indicating ball showing and FIG. 14C shows the device in the second activated position with two indicating balls showing. FIG. 14D shows the extension segment alone.

The present invention allows the stem biased by the spring to be released into a partially extended position upon attainment of a specified temperature, and then into a fully extended position upon attainment of an additional specified temperature, giving a visual indication to the user that the product has reached a first temperature and then has reached a second temperature. The second temperature often is an acceptable temperature level and doneness when the device is used in connection with cooking food.

Referring now to FIGS. 1A and 1B, a prior art single stage temperature indicating device 10 is shown. As the present invention is an improvement on the category of the known temperature indicating device as represented by FIGS. 1A and 1B, this known device will be described in detail to provide a sufficient background for understanding the basic structure and function of the present invention.

The temperature indicating device 10 generally includes an elongate housing 11 having a pointed tip 12 and a transversely extending flange 13 formed opposite the tip 12. The upper surface of the flange 13 is preferably substantially planar. A plurality of barbs 14 (here shown two in number) are formed on the exterior of the housing 11. The shape, size and number of exterior barbs 14 may vary as desired and securely hold the temperature indicating device 10 in place during storage, handling and cooking of the product. The temperature indicating device 10 may be inserted into poultry, meat or other products by positioning the pointed tip 12 against the product and pressing the thermometer 10 inwardly until the underside of flange 13 engages the outer surface of the product.

The housing 11 is formed with a longitudinally extending bore 19 having an open end 20 proximate the flange 13 and a closed end 21 near the pointed tip 12. The open end 20 can have a greater cross sectional opening than the remainder of the bore to facilitate assembly of the temperature indicating device 10. The bore 19 can taper inwardly from the open end 20 to an annular restriction 22 which terminates in a downward outward slanted shoulder 23. The interior of the housing 11 includes a pair of spaced cylindrical neck regions 24 and 25 spaced inwardly from the restriction 22 and shoulder 23. The neck regions 24 and 25 define a first internal cavity 26 between the neck region 24 and the closed end 21 of the bore and a second internal cavity 27 between the two neck regions 24 and 25.

An indicator rod 36 is slidably positioned in the bore 19 of the housing 11. The indicator rod 36 generally includes an enlarged front end portion 37 and a first stem stretch 38 extending upwardly from the front end portion 37. A raised portion 39 separates the first stem stretch 38 from a second stem stretch 40. The first stem stretch 38 has a lesser cross sectional area than the adjacent portion of the front end portion 37, and the second stem stretch 40 has a lesser cross sectional area than the raised portion 39. The neck regions 24, 25 and the internal cavities 26, 27 of the housing 11 cooperate with the front end portion 37, raised portion 39 and stem stretches 38, 40 of the indicator rod 36 to retain the indicator rod 36 in the housing 11.

The front end portion 37 and the first stem stretch 38 are positioned in the first internal cavity 26, the second stem stretch 40 is positioned in the second cavity 27 and the raised portion 39 is generally aligned with the first neck region 24. The indicator rod 36 is positioned in the bore with the front end portion 37 and the first stem stretch 38 being spaced inwardly in the bore 19 from the first neck region 24, and the raised portion 39 is spaced inwardly from the second neck region 25. The "first axial distance" is the axial distance between the surface of the first stem stretch 38 extending inwardly from the peripheral edge of the front end portion 37 and the first neck region 24, the "second axial distance" is the axial distance between the surface of the second stem stretch 40 extending inwardly from the peripheral edge of the raised portion 39 and the second neck region 25, the "first radial distance" is the radial distance between the first stem stretch 38 and the wall of the first interior cavity 26, and the "second radial distance" is the radial distance between the second stem stretch 40 and the wall of the second interior cavity 27. As is shown for example purposes in FIGS. 1A and 1B, the first radial distance is less than the first axial distance and the second radial distance is less than the second axial distance such that when the fusible material 59 filling the cavities 26, 27 is in solid form, the shoulder extending outwardly from the first neck region 24 exerts a substantially downward directed force on the inward extending surface of the first stem stretch 38 and the shoulder extending outwardly from the second neck region 25 exerts a substantially downward directed force on the inward extending surface of second stem stretch 40. However, if desired the housing 11 and indicator rod 36 may be configured to provide a different relationship between the neck regions 24, 25, internal cavities 26, 27, and the indicator rod 36.

A tapered shoulder 44 extends outwardly from the second stem stretch 40 to an intermediate portion 45 of the indicator rod 36. The intermediate portion 45 terminates in an outward extending collar portion 46 which has a greater cross sectional diameter than the intermediate portion 45. Extending upwardly from the collar portion 46 is a rear end portion 47. The rear end portion 47 may have a lesser cross sectional diameter than the collar 46. The rear end portion 47 terminates in an enlarged cap portion 48 having a transversely extending underside 49. The underside 49 of the cap 48 is adapted to mate with the upper surface of the flange 13 on the housing 11. The underside 49 of the cap 48 preferably is substantially planar. Instead of flange 13 and cap 48 having substantially planar surfaces, the upper surface of the flange 13 and the underside 49 of the cap 48 may be formed with mating grooves and ridges or other complementary mating shapes if desired.

The temperature indicating device 10 includes means for urging the indicator rod 36 from the fully inserted position shown in FIG. 1A to an extended position with the cap 48 spaced from the flange 13 of the housing 11 shown for example in FIG. 1B. One such means is provided by a coiled spring 55 disposed around the intermediate portion 45 of the indicator rod 36. The spring 55 is compressed between the slanted shoulder 33 of the housing 11 and the collar 46 of the indicator rod 36 when the indicator rod 36 is in the fully inserted position of FIG. 1A. Once the temperature indicating device 10 has reached a predetermined elevated temperature, the spring 55 is allowed to expand, moving the collar 46 away from the shoulder 33 and causing the indicator rod 36 to be displaced outwardly through the open end 20 of the housing 11. The spring 55 is one example of a suitable means for urging the indicator rod 36 to an extended position. However, other means may be substituted for the spring 55.

A fusible material 59 fills the first and second internal cavities 26, 27 around the indicator rod 36. The fusible material 59 is in the form of a solid under normal conditions and is selected so that the material 59 softens or melts at the desired temperature for the particular application. The fusible material 59 may be provided by various materials, including alloys, metals, organic materials and the like. The solid material 59 engages front end portion 37, raised portion 39 and stem stretches 38, 40 to securely retain the indicator rod 36 in the housing 11. The stem stretches 38, 40 increase the surface area of the indicator rod 36 engaged by the fusible material 59 so that the indicator rod 36 may be more securely retained within the housing 11.

When the temperature indicating device 10 is heated to a predetermined elevated temperature, the fusible material 59 softens or melts, releasing the front end portion 37, raised portion 39 and stem stretches 38, 40 of the indicator rod 36 from engagement with the solid fusible material 59. The spring 55 is allowed to expand with the melting or softening of the fusible material 59, moving the collar 46 against the slanted shoulder 23 and pulling the front end portion 37 of the indicator rod 36 from the softened fusible material 59. The outward displacement of the indicator rod 36 provides a visual indication the temperature indicating device 10 has reached the desired temperature.

The temperature indicating device 10 of the present invention is manufactured by separately forming the housing 11 and the indicator rod 36. The housing 11 and the indicator rod 36 are preferably formed by injection molding. A pellet of fusible material 59 is positioned in the bore 19 and the housing 11 is heated to melt the fusible material 59. Alternatively, the fusible material 59 may be deposited in the housing 11 in liquid form. The spring 55 is inserted into the bore 19. The indicator rod 36 is pressed into the housing 11 until the cap 48 engages the flange 13. The indicator rod 36 is held in place while the temperature indicating device cools, allowing the fusible material 59 to solidity. Once the fusible material 59 has solidified, the temperature indicating device 10 may be prepared for shipment.

With this generalized background, the present invention now will be disclosed.

Referring now to FIGS. 2, 15, and 3, a first embodiment of the present invention 10 comprises two stem segments 36, 60 that are snapped together to form a slidable stem. This first embodiment comprises an elongate housing 11 having a pointed tip 12 and a transversely extending flange 13 formed opposite the tip 12. The upper surface of the flange 13 is preferably substantially planar. A plurality of barbs 14 (here shown two in number) are formed on the exterior of the housing 11. The shape, size and number of exterior barbs 14 may vary as desired, and securely hold the temperature indicating device 10 in place during storage, handling and cooking of the product. The temperature indicating device 10 may be inserted into poultry, meat or other products by positioning the pointed tip 12 against the product and pressing the thermometer 10 inwardly until the underside of flange 13 engages the outer surface of the product.

The housing 11 is formed with a longitudinally extending bore 19 having an open end 20 proximate the flange 13 and a closed end 21 near the pointed tip 12. The open end 20 has a tapered opening to the bore 19 to facilitate assembly of the temperature indicating device 10. The bore 19 comprises an annular restriction 22 to assist in retaining the indicator rod 36 and extension segment 60 within the bore 19. The interior of the housing 11 includes a cylindrical neck region 24 and a choke or narrowed bore 25 spaced inwardly from the restriction 22. A first internal cavity 26 is located between the cylindrical neck region 24 and the closed end 21 of the bore 19 and generally includes narrowed bore 25. A second internal cavity 27 is located between the neck region 24 and the open end 20.

An indicator rod 36 is slidably positioned in the bore 19 of the housing 11. The indicator rod 36 includes a first stem stretch 72 and a second stem stretch 73. The first stem stretch 72 is a generally hollow cylindrical structure for accommodating at least a portion of the extension segment 60 and the second stem stretch 73 is a generally solid cylindrical structure. A collar 46 separates the first stem stretch 72 from the second stem stretch 73. The collar 46 preferably has a greater cross sectional diameter than either of the stem stretches 72, 73 such that the top surface of the collar 46 can interact with the restriction 22 to prevent the indicator rod 36 from fully exiting the housing 11 and such that the bottom surface of the collar 46 can interact with a spring 55 as disclosed in more detail below. The second stem stretch 73 terminates in an enlarged cap portion 48 having a transversely extending underside 49. The underside 49 of the cap 48 is adapted to mate with the upper surface of the flange 13 on the housing 11. The underside 49 of the cap preferably is substantially planar. Instead of flange 13 and cap portion 48 having substantially planar surfaces, the upper surface of the flange 13 and the underside 49 of the cap may be formed with mating grooves and ridges or other complementary mating shapes if desired.

The hollow interior 75 of the indicator rod 36 is structured to accommodate at least a portion of the extension segment 60. The hollow interior 75 has a generally smooth bore 76 of preferably constant diameter except for a reduced diameter interior stop 77 located proximal to the entrance of the bore 76. The extension segment 60 is slidably positioned partially in the bore 19 and partially in the hollow interior 75 of the first stem stretch 72 of the indicator rod 36. As discussed below, an enlarged rear end portion 61 on the extension segment 60 cooperates with the interior stop 77 to prevent the extension segment 60 from exiting the hollow interior 75.

The extension segment 60 is a generally cylindrical rod having an enlarged front end portion 37 at the end of a first extension stretch 78, an enlarged rear end portion 61 at the end of a second extension stretch 79, and optionally a centrally located stop 62 (see FIG. 3) to prevent the extension segment from travelling too far into the hollow interior 75 and/or to prevent the indicator rod 36 from travelling too far into the bore 19. The extension segment 60 is snapped into the hollow interior 75 of the first stem stretch 72, with the enlarged rear end portion 61 cooperating with the interior stop 77 located on the interior surface of bore 76 of the hollow interior 75 of the first stem stretch 72 to prevent the extension segment 60 from fully disengaging from the first stem stretch 72. When the indicator rod 36 with the extension segment 60 is inserted into the housing 11, the enlarged front end portion 37 of the extension segment 60 is positioned in the first internal cavity 26 while the first and second stem stretches 72, 73 are positioned in the second internal cavity 27.

The front end portion 37 and the first extension stretch 78 are positioned in the first internal cavity 26 and the second stem stretch 73 (containing the second extension stretch 79) is positioned in the second internal cavity 27. The indicator rod 36 is positioned in the bore 19 with the front end portion 37 and at least a portion of the first extension stretch 78 being spaced inwardly in the bore from the cylindrical neck region 24. However, if desired the housing 11 and indicator rod 36 may be configured to provide a different relationship between the neck region 24, the narrowed bore 25, the internal cavities 26, 27, and the indicator rod 36.

The temperature indicating device 10 includes means for urging the indicator rod 36 from the fully inserted position shown in FIGS. 2A and 15A to an extended position with the cap 48 spaced from the flange 13 of the housing 11 shown for example in FIGS. 2B, 15B, 2C, and 15C, when activated. One such means is provided by a coiled spring 55 disposed around the first stem stretch 72 of the indicator rod 36 and the portion of the extension segment 60 extending out of the first stem stretch 72. The spring 55 is compressed between the cylindrical neck region 24 of the housing 11 and the bottom surface of the collar 46 of the indicator rod 36 when the indicator rod 36 is in the fully inserted position of FIGS. 2A and 15A. Once the temperature indicating device 10 has reached a predetermined elevated temperature and at least a portion of the fusible material 59 (see below for a full disclosure of the fusible material 59 softening sequence), either the indicator rod 36 or the extension segment 60 are at least partially released, which allows the spring 55 to expand, thus moving the collar 46 away from the cylindrical neck region 24 and causing the indicator rod 36 to be displaced outwardly through the open end 20 of the housing 11. The spring 55 is one example of a suitable means for urging the indicator rod 36 to an extended position. However, other means may be substituted for the spring 55.

In the first alternative embodiment shown in FIG. 2, a fusible material 59 fills (a) the first internal cavity 26 including the narrow bore 25 around the first extension stretch 78, and particularly around the enlarged front end 37, and (b) the lower portion of the second internal cavity 27, corresponding to the volume proximal to the cylindrical neck region 24, of the housing 11. The fusible material 59 is in the form of a solid under normal conditions and is selected so that the fusible material 59 softens or melts at the desired temperature for the particular application. The fusible material 59 may be provided by various materials, including alloys, metals, organic materials and the like. The fusible material 59, filling the volumes disclosed above, engages (a) the front end portion 37 and first extension stretch 78 to securely retain the extension segment 60 in the first internal cavity 26 and the narrow bore 25 of the housing 11, and (b) the flange 80 and a portion of the first stem stretch 72 proximal to flange 80 to securely retain the indicator rod 36 in the lower portion of the second internal cavity 27 of the housing 11.

In this first alternative embodiment, the fusible material 59 in the lower portion of the second internal cavity 27 softens first, as heat penetrates the device 10 from the top (the portion of the device at or near the surface of the food) down in a conventional oven, at a first stage or time, allowing the indicator rod 36 to be urged away from the closed end 21 by the action of the spring 55 against the collar 46 and the cylindrical neck region 24. The interior stop 77 cooperates with the enlarged rear end portion 61 to prevent the indicator rod 36 from fully disengaging from the extension segment 60, allowing the indicator rod 36 to extend only a first distance out of the housing 11. The fusible material 59 in the first internal cavity 26 softens second, at a second stage or time, allowing the first extension stretch 78 to be urged out of the first internal cavity 26, again by the action of the spring, allowing the indicator rod 36 to extend a second distance out of the housing 11. The annular restriction 22 cooperates with the collar 46 to prevent the indicator rod 36 from fully disengaging from the housing 11.

Thus, in this first alternative embodiment, when the temperature indicating device 10 is heated to a predetermined elevated temperature, the fusible material 59 softens or melts, releasing at different times (a) the indicator rod 36 from engagement with the solid fusible material 59 in the lower portion of the second interior cavity 27 proximal to cylindrical neck region 24 and (b) the front end portion 37 and the first extension stretch 78 of the extension segment 60 from engagement with the solid fusible material 59 in the first internal cavity 26 including the narrow bore 25. The spring 55 is allowed to expand with the melting or softening of the fusible material 59, moving the collar 46 and therefore the indicator rod 36 away from the cylindrical neck region 24 and pulling the extension segment 60 from the softened fusible material 59 in the first internal cavity 26, thus causing the indicator rod 36 to be displaced outwardly through the open end 20 of the housing 11. The outward displacement of the indicator rod 36 provides a visual indication the temperature indicating device 10 has reached the desired temperature.

FIG. 2A illustrates the inactivated position of this embodiment. FIG. 2B illustrates the first activation position of this embodiment indicating that a first temperature has been reached (the fusible material 59 in the lower portion of the second internal cavity 27 proximal to the cylindrical neck portion 24 has been softened). FIG. 2C illustrates the second activation position of this embodiment indicating that a second temperature has been reached (the fusible material 59 in first internal cavity 26 has been softened).

In the second alternative embodiment shown in FIG. 15, a fusible material 59 fills (a) the lower portion of the first internal cavity 26 particularly around the enlarged front end 37, and if desired the narrow bore 25 around the first extension stretch 78, and (b) the hollow interior 75 around the second extension stretch 79, and particularly around the enlarged rear end portion 61. The fusible material 59 is in the form of a solid under normal conditions and is selected so that the fusible material 59 softens or melts at the desired temperature for the particular application. The fusible material 59 may be provided by various materials, including alloys, metals, organic materials and the like. The fusible material 59 engages rear end portion 61 and second extension stretch 79 to securely retain the extension segment 60 in the indicator rod 36 and the fusible material 59 engages front end portion 37 and first extension stretch 78 to securely retain the indicator rod 36 in the housing 11. The extension stretches 78, 79 increase the surface area of the extension segment 60 engaged by the fusible material 59 so that the combination of the extension segment 60 and the indicator rod may be more securely retained within the housing 11.

In this second alternative embodiment, the fusible material 59 in the hollow interior 75 softens first, at a first stage or time, allowing the indicator rod 36 to be urged away from the extension segment 60, such that the second extension stretch 79 is urged out of the hollow interior 75, and the fusible material 59 in the first internal cavity 26 softens second, at a second stage or time, allowing the first extension stretch 78 to be urged at least partially out of the first internal cavity 26. The interior stop 77 cooperates with the enlarged rear end portion 61 to prevent the extension segment 60 from fully disengaging from the first stem stretch 72, and the annular restriction 22 cooperates with the collar 46 to prevent the indicator rod 36 from fully disengaging from the housing 11.

Thus, in this second alternative embodiment, when the temperature indicating device 10 is heated to a predetermined elevated temperature, the fusible material 59 softens or melts, releasing at different times (a) the front end portion 37 and first extension stretch 78 of the extension segment 60 from engagement with the solid fusible material 59 in the hollow interior 75 and (b) the rear end portion 61 and the second extension stretch 79 of the extension segment 60 from engagement with the solid fusible material 59 in the first internal cavity 26. The spring 55 is allowed to expand with the melting or softening of the fusible material 59, moving the collar 46 away from the cylindrical neck region 24 and pulling the extension segment from the softened fusible material 59 in the hollow interior 75 and the first internal cavity 26, thus causing the indicator rod 36 to be displaced outwardly through the open end 20 of the housing 11. The outward displacement of the indicator rod 36 provides a visual indication the temperature indicating device 10 has reached the desired temperature. FIGS. 3A and 3B illustrates an exploded view of the construction of the indicator rod 36 and the extension segment 60.

FIG. 15A illustrates the inactivated position of this embodiment. FIG. 15B illustrates the first activation position of this embodiment indicating that a first temperature has been reached (the fusible material 59 in hollow interior 75 has been softened). FIG. 15C illustrates the second activation position of this embodiment indicating that a second temperature has been reached (the fusible material 59 in first internal cavity 26 has been softened).

FIGS. 3A and 3B illustrates an exploded view of the construction of the indicator rod 36 and the extension segment 60. FIG. 3C illustrates the inactivated position of the indicator rod 36 and the extension segment 60. FIG. 3D representing the activated position of the indicator rod 36 relative to the extension segment 60.

Referring now to FIGS. 4, 16, and 5, a second embodiment of the invention is shown, this embodiment being a refinement of the embodiment shown in FIGS. 2, 15, and 3. Specifically, the embodiment of FIGS. 4, 16, and 5 comprise an extension segment 60 with two enlarged front end portions 37A, 37B and a housing 11 having a first internal cavity 26 structured to accommodate both front end portions 37A, 37B. In this embodiment, the extension segment 60 still is a generally cylindrical rod, now having a first enlarged front end portion 37A at the end of a first extension stretch 78 and a second enlarged front end portion 37B proximal to but spaced apart from the first enlarged front portion 37A by a length of the first extension stretch 78A. When the indicator rod 36 with the extension segment 60 is inserted into the housing 11, the enlarged front end portions 37A, 37B of the extension segment 60 are positioned in the first internal cavity 26. The narrowed bore 25 is a portion of the internal cavity 26 located between the two first internal cavities 26A, 26B. Typically, the internal cavity 26 structure is sufficient to accommodate the two enlarged front portions 37A, 37B between the neck region 24 and the pointed tip 21. The second enlarged front portion 37B can have a diameter the same as, larger than, or smaller than the diameter of the first enlarged front portion 37A.

The front end portion 37 and the first stem stretch 72 are positioned in the first internal cavity 26 and the second stem stretch 73 is positioned in the second internal cavity 27. The indicator rod 36 is positioned in the bore 19 with the front end 37 and the first stem stretch 72 being spaced inwardly in the bore 19 from the cylindrical neck region 24. However, if desired the housing 11 and indicator rod 36 may be configured to provide a different relationship between the neck region 24, the narrowed bore 25, the internal cavities 26, 27, and the indicator rod 36.

In the third alternative embodiment shown in FIG. 4, the fusible material 59 fills (a) the entire first internal cavity 26 including the narrow bore 25 between the first internal cavities 26A, 26B, and particularly around the enlarged front end portions 37A, 37B and the length of first extension stretch 78A, and (b) the lower portion of the second internal cavity 27 proximal to the cylindrical neck 24. This third alternative embodiment operates in a manner similar to the first alternative embodiment disclosed in connection with FIG. 2.

In the fourth alternative embodiment shown in FIG. 16, the fusible material 59 fills (a) the entire first internal cavity 26, including the narrow bore 25 between the first internal cavities 26A, 26B, and particularly around the enlarged front end portions 37A, 37B and the length of first extension stretch 78A, which increases the holding or security of the extension segment 60 in the housing 11, and (b) the hollow interior 75 around the second extension stretch 79, and particularly around the enlarged rear end portion 61. This fourth alternative embodiment operates in a manner similar to the second alternative embodiment disclosed in connection with FIG. 15.

The addition of the second front end portion 37B increases the surface area and enhances the geometry of the extension segment 60 engaged by the fusible material 59 so that the combination of the extension segment 60 and the indicator rod may be more securely retained within the housing 11. An optional raised portion 39 also is shown in FIGS. 4 and 5, which amounts to an additional collar around the first extension stretch 78, and which also increases the surface area and enhances the geometry of the extension segment 60 engaged by the fusible material 59 so that the combination of the extension segment 60 and the indicator rod 36 may be more securely retained within the housing 11.

In the third alternative embodiment, FIG. 4A illustrates the inactivated position of this embodiment, namely the inactivated position of the indicator rod 36 and the extension segment 60. FIG. 4B illustrates the first activation position of this embodiment indicating that a first temperature has been reached (the fusible material 59 in the lower portion of the second internal cavity 27 proximal to cylindrical neck 24 has been softened), namely the first activation position of the indicator rod 36 and the extension segment 60. FIG. 4C illustrates the second activation position of this embodiment indicating that a second temperature has been reached (the fusible material 59 in first internal cavity 26 has been softened), namely the second activation position of the indicator rod 36 and the extension segment 60.

In the fourth alternative embodiment, FIG. 16A illustrates the inactivated position of this embodiment, namely the inactivated position of the indicator rod 36 and the extension segment 60. FIG. 16B illustrates the first activation position of this embodiment indicating that a first temperature has been reached (the fusible material 59 in hollow interior 75 has been softened), namely the first activation position of the indicator rod 36 and the extension segment 60. FIG. 16C illustrates the second activation position of this embodiment indicating that a second temperature has been reached (the fusible material 59 in first internal cavity 26 has been softened), namely the second activation position of the indicator rod 36 and the extension segment 60.

The embodiment of FIGS. 4, 16, and 5 also comprise spacing fins 8 on the second stem stretch 73 proximal to the underside 49 of the cap 48 and an enlarged bore flange 80 with spacing fins 81 proximal to the entrance to the hollow interior 75. These optional additions assist in adding strength to the bore flange 80. FIGS. 5A and 5B illustrates an exploded view of the construction of the indicator rod 36 and the extension segment 60.

Referring now to FIGS. 6 and 7, a fifth embodiment of the invention is shown, this embodiment being a simplification of the embodiment shown in FIG. 15. Specifically, this embodiment has a simplified bore 19 configuration comprising a generally cylindrical longitudinally extending bore 19 having an open end 20 proximate the flange 13 and a closed end 21 near the pointed tip 12. In the device shown in FIGS. 6 and 7, the bore 19 comprises a generally cylindrical first internal cavity 26 located between the narrowed bore 25 and the closed end 21 of the bore 19, a generally cylindrical second internal cavity 27 located between the narrowed bore 25 and the open end 20, and a frusto-conical cavity 27A connecting the first internal cavity 26 to the second internal cavity 27. In this embodiment, the diameter of the second internal cavity 27 is greater than the diameter of the first internal cavity 26 and the narrow bore 25, such that the frusto-conical cavity 27A narrows in the direction from the open end 20 to the pointed tip 21 (from the second internal cavity 27 to the narrow bore 25).

FIG. 6A illustrates the inactivated position of this embodiment, with FIG. 7A illustrating the inactivated position of the indicator rod 36 and the extension segment 60. FIG. 6B illustrates the first activation position of this embodiment indicating that a first temperature has been reached (the fusible material 59 in hollow interior 75 has been softened), with FIG. 7B illustrating the first activation position of the indicator rod 36 and the extension segment 60. FIG. 6C illustrates the second activation position of this embodiment indicating that a second temperature has been reached (the fusible material 59 in first internal cavity 26 has been softened), with FIG. 7C representing the second activation position of the indicator rod 36 and the extension segments 60.

Referring now to FIGS. 8 and 9 a sixth embodiment of the invention is shown in which the second stem stretch 173 of the indicator rod 136 and the second extension stretch 179 of the extension segment 160 are in effect reversed relative to the embodiments shown in FIGS. 2-7. This embodiment also comprises an elongate housing 111 formed with a longitudinally extending bore 119 having an open end 120 proximate the flange 113 and a closed end 121 near the pointed tip 112. In the device shown in FIGS. 8 and 9, the interior of the housing 111 includes a shaped first internal cavity 126 and a generally cylindrical second internal cavity 127. The first internal cavity 126 comprises a neck region 124 and a narrowed bore 125.

The indicator rod 136 includes a first stem stretch 172 and a second stem stretch 173. The first stem stretch 172 is a generally solid cylindrical structure for cooperating with at least a portion of the extension segment 160, which comprises a hollow section, and the second stem stretch 173 is a generally solid cylindrical structure having an overall diameter greater than the diameter of the first stem stretch 172. The collar 146 separates the first stem stretch 172 from the second stem stretch 173 and preferably has a greater cross sectional diameter than either of the stem stretches 172, 173, such that the top surface of the collar 146 can interact with the restriction 122 to prevent the indicator rod 136 from fully exiting the housing 111 and such that the bottom surface of the collar 146 can interact with a spring 155 as disclosed in more detail below. If desired, the collar 146 may simply be a shoulder between the second stem stretch 173 and the first stem stretch 172.

The first stem stretch 172 is a generally cylindrical rod having a first enlarged front end portion 187 at the free end of the first stem stretch 172, an optional second enlarged front end portion 187A proximal to but spaced apart from the first enlarged front end portion 187, and a stop 162. The first stem stretch 172 is snapped into a hollow interior 175 of the second extension stretch 179 of the extension segment 160. The stop 162 cooperates with an interior stop 177 located on the interior surface of bore 176 of the hollow interior 175 of the second extension stretch 179 to prevent the indicator rod 136 from fully disengaging from the hollow interior 175 of the extension segment 160.

The extension segment 160 is a generally cylindrical rod having an enlarged front end portion 137 at the end of a first extension stretch 178 and a generally hollow cylindrical second extension stretch 179 for accommodating at least a portion of the first stem stretch 172 of the indicator rod 136. The extension segment also may comprise a second enlarged front end portion 137B proximal to but spaced apart from the first enlarged front portion 37A by a length of the first extension stretch 178. The hollow interior 175 of the extension segment 160 is structured to accommodate at least a portion of the first stem stretch 172. The hollow interior 175 has a generally smooth bore 176 of preferably constant diameter except for the reduced diameter interior stop 177 located proximal to the entrance of the bore 176. The first stem stretch 172 is snapped into and slidably positioned at least partially in the hollow interior 175 of the second extension stretch 179 of the extension segment 160. When the indicator rod 136 with the extension segment 160 is inserted into the housing 111, the enlarged front end 137 of the extension segment 160 is positioned in the first internal cavity 126 while the second extension stretch 179 (containing the first stem stretch 172) and the second stem stretch 173 are positioned in the second internal cavity 127.

This embodiment of the temperature indicating device 110 also includes means for urging the indicator rod 136 from the fully inserted position shown in FIG. 8A to extended positions with the cap 148 spaced from the flange 113 of the housing 111 shown for example in FIGS. 8B and 8C, when activated. One such means is provided by a coiled spring 155 disposed around the second extension stretch 179 of the extension segment 160 (initially) and the portion of the first stem stretch 172 extending out of the hollow interior 175 of the second extension stretch 179 (after activation). The spring 155 is compressed between the cylindrical neck region 124 of the housing 111 and the collar 146 of the indicator rod 136 when the indicator rod 136 is in the fully inserted position of FIG. 8A. Once the temperature indicating device 110 has reached a predetermined elevated temperature, the fusible material 159 in the hollow interior 175 and in the first internal cavity 126/narrow bore 125 softens (preferably not simultaneously) and releases the extension segment 160 from the first internal cavity 126 and releases the first stem stretch 172 from the hollow interior 175, which allows the spring 155 to expand, thus moving the collar 146 away from the cylindrical neck region 124 and causing the indicator rod 136 to be displaced outwardly through the open end 120 of the housing 111. The spring 155 is one example of a suitable means for urging the indicator rod 136 to an extended position. However, other means may be substituted for the spring 155.

In a preferred embodiment, the fusible material 159 in the hollow interior 175 softens first, at a first stage or time, allowing the indicator rod 136 to be urged partially out of the hollow interior 175, and the fusible material 159 in the first internal cavity 126 softens second, at a second stage or time, allowing the first extension stretch 178 to be urged at least partially out of the first internal cavity 126. The interior stop 177 cooperates with the stop 162 to prevent the indicator rod 136 from fully disengaging from the extension segment 160, and the annular restriction 122 cooperates with the collar 146 to prevent the indicator rod 136 from fully disengaging from the housing 111.

A fusible material 159 fills (a) the first internal cavity 126, including the narrow bore 125, around the first extension stretch 178, and particularly around the enlarged front end portion 137, and (b) the hollow interior 175 around the first stem stretch 172, and particularly around the enlarged front end portion 187. The fusible material 159 is in the form of a solid under normal conditions and is selected so that the fusible material 159 softens or melts at the desired temperature for the particular application. The fusible material 159 may be provided by various materials, including alloys, metals, organic materials and the like. The fusible material 159 engages front end portion 137 and first extension stretch 178 to securely retain the extension segment 160 in the first internal cavity 126 and the fusible material 159 engages front end portion 187 and first stem stretch 172 to securely retain the indicator rod 136 in the hollow interior 175. The first extension stretch 178 and the first stem stretch 172 increase the surface area engaged by the fusible material 159 so that the combination of the extension segment 160 and the indicator rod 136 may be more securely retained within the housing 111.

The embodiment of FIGS. 8 and 9 also comprise spacing fins 108 on the second stem stretch 173 proximal to the underside 149 of the cap 148. These optional additions assist in increasing the stability of the indicator rod 136 within the housing 111 by reducing the gaps between the indicator rod 136 and the bore 119.

FIG. 8A illustrates the inactivated position of this embodiment, namely the inactivated position of the indicator rod 136 and the extension segment 160. FIG. 8B illustrates the first activation position of this embodiment indicating that a first temperature has been reached (the fusible material 159 in hollow interior 175 has been softened), namely the first activation position of the indicator rod 136 and the extension segment 160. FIG. 8C illustrates the second activation position of this embodiment indicating that a second temperature has been reached (the fusible material 159 in first internal cavity 126 has been softened), namely the second activation position of the indicator rod 136 and the extension segment 160.

Referring now to FIGS. 10 and 11, a seventh embodiment of the invention is comprised of three stem segments 36, 60, 260 that are snapped together to form a slidable stem. This embodiment comprises an indicator rod 36 and an extension segment 60 similar to those disclosed in connection with FIGS. 2 and 3 and a second extension segment 260 similar to the extension segment 160 disclosed in connection with FIGS. 8 and 9. Second extension stretch 79 of extension segment 60 cooperates with first stem stretch 72 of indicator rod 36 in a manner similar to that disclosed in connection with FIGS. 2 and 3. Enlarged end portion 261 of first extension stretch 78 of extension segment 60 cooperates with the hollow interior 275 of the second extension stretch 279 of the second extension segment 260 in a manner similar to the cooperation of first stem stretch 172 and second extension stretch 179 as disclosed in connection with FIGS. 8 and 9. First extension stretch 278 of second extension segment 260 cooperates with the first internal cavity 26 in a manner similar to the cooperation of first extension stretch 178 with first internal cavity 126 as disclosed in connection with FIGS. 8 and 9. FIG. 11A illustrates an exploded view of the construction of the indicator rod 36, the extension segment 60, and the second extension segment 260.

FIG. 10A illustrates the inactivated position of this embodiment, with FIG. 11B illustrating the inactivated position of the indicator rod 36 and the extension segments 60, 260. FIG. 10B illustrates the first activation position of this embodiment indicating that a first temperature has been reached (the fusible material 59 in hollow interior 75 has been softened), with FIG. 11C illustrating the first activation position of the indicator rod 36 and the extension segments 60, 260. FIG. 10C illustrates the second activation position of this embodiment indicating that a second temperature has been reached (the fusible material 59 in hollow interior 275 has been softened), with FIG. 11D illustrating the second activation position of the indicator rod 36 and the extension segments 60, 260. FIG. 10D illustrates the third activation position of this embodiment indicating that a third temperature has been reached (the fusible material 59 in first internal cavity 26 has been softened), with FIG. 11 E representing the third activation position of the indicator rod 36 and the extension segments 60, 260.

Referring now to FIG. 12, an eighth embodiment of the invention is shown. This embodiment is similar in structure and operation to the embodiment disclosed in connection with FIGS. 4, 16 and 5, but with an elongated hollow interior 75 and the addition of a spring 355 within the hollow interior 75 to act directly on the extension segment 60. For example, spring 355 can extend between the top surface 356 of the hollow interior 57 and the top surface 62A of the centrally located stop 62. When the stem, which includes the indicator rod 36 and the extension segment 60, is inserted into the barrel housing 11 during assembly, the spring 355 within the hollow interior 75 will force the extension segment 60, and particularly the enlarged front end portion 37, to seat against the bottom of the first internal cavity 26. This will allow complete displacement of the soft fusible material 59 within the first internal cavity 26, and will aid the fit of the stem within the barrel housing 11. This provides for the self-adjusting of the stem depth within the housing 11 allowing the device to conform to different processing methods and the possible shrinkage of the plastic parts making up the device. The spring 355 also can assist in moving the indicator rod 36 from the inactivated position to the first activated position. Preferably, this embodiment comprises fusible material 59 in first internal cavity 26 and the lower portion of second internal cavity 27 similar to the embodiment disclosed in connection with FIG. 4, and does not comprise fusible material 59 in the hollow interior 75, which will help prevent fusible material 59 from interfering with spring 355.

Referring now to FIG. 13, a ninth embodiment of the invention is shown having a securing pin 100 between the indicator rod 36 and the extension segment 60, with FIG. 13A being the completed device, FIG. 13B being the extension segment, and FIG. 13C being a cross section through line 13'-13'. These views represent an embodiment of the invention in which the extension segment 60 is slidably secured to the indicator rod 36 in an alternate manner. Extension segment 60 comprises pin run 102, which is an elongated slot extending through second extension stretch 79 from a position proximal to enlarged rear end portion 61 towards centrally located stop 62, if present. The length of pin run 102 is of less importance, so long as it is of sufficient length to allow indicator rod 36 and extension segment 60 to separate a sufficient distance to allow the movement of the indicator rod 36 relative to the housing 11 to indicate that the first temperature has been reached. Pin 100 extends through the wall of the indicator rod 36 and through the pin run 102 of the extension segment 60 to slidably retain the extension segment 60 in the hollow interior 75 of the indicator rod 36. Thus, interior stop 77 no longer is necessary.

Generally, the same or a different type of fusible material 59, 159 can be used as the firing media within the various cavities 25, 26, 27 and hollow interiors 75, 175 of the device 10. By using different types of fusible materials 59, 159 as firing medias, different times/temperatures can be achieved between the stages. Depending on the amount of fusible material 59, 159 used, the same type of fusible material 59, 159 can be used in each cavity 25, 26, 27 and hollow interior 75, 175. For example, if a lesser amount of fusible material 59 is used in the hollow interior 75 than in the first internal cavity 26, the lesser amount of fusible material 59 in the hollow interior 75 will soften first, prior to the softening of the greater amount of fusible material in the first internal cavity 26. This will allow the release of the extension segment 60 from the hollow interior 75 prior to the release of the extension segment from the first internal cavity 26. This in turn will allow the indicator rod 36 to extend a first distance out of the housing 11 to indicate that the first temperature has been reached. After the greater amount of fusible material 59 in the first internal cavity 26 softens, the extension segment will be released from the first internal cavity 26, which will allow the indicator rod 36 to extend a second distance out of the housing 11 to indicate that the second temperature has been reached. Alternatively, different types of fusible materials 59 can be used in each, and by using different types of fusible materials 59 as firing media, different times/temperatures can be achieved between the stages. The same combinations of different types of fusible materials 59, 159 can be used in each of the disclosed embodiments. By different fusible materials it is meant fusible materials having different softening or melting temperatures.

Referring now to FIG. 14, a tenth embodiment of the present invention is shown. In this embodiment, the indicating cap 49 is replaced with two indicating balls 248, 249 to show the two indicating positions or temperatures. FIG. 14A shows the device in the inactivated position. FIG. 14B shows the device in the first activated position with only the first indicating ball 248 showing and FIG. 14C shows the device in the second activated position with both the first indicating ball 248 and the second indicating ball 249 showing. FIG. 14D shows the structure of the extension segment 60 alone illustrating the position of the indicating balls 248, 249. In this embodiment, the restriction 22 is located lower in the bore 19 such that when the device is in the inactivated state, both indicating balls 248, 249 are contained within the bore 19, preferably with the lower surface of the second indicating ball 249 in contact with the upper surface of restriction 22 to prevent dust, dirt, fluids, and other foreign materials from entering the bore 19 prior to use.

In use, when the first temperature has been reached and the first portion of the fusible material 59 has softened, spring 55 forces indicator rod 36 a first distance out of housing, this distance being sufficient such that the first indicator ball 248 emerges from the housing 11 and is visible to the user. When the second temperature has been reached and the second portion of the fusible material 59 has softened, spring 55 forces indicator rod 36 a second distance out of housing, this distance being sufficient such that the second indicator ball 249 also emerges from the housing 11 and is visible to the user. In this manner, the device provides for another manner of visibly indicating when each of the first and second temperatures have been reached. Third and additional indicator balls also can be included with alternative embodiments of the device for showing third and additional temperatures, respectively.

Various alternate embodiments also are contemplated. For example, although the device has been disclosed with the fusible material softening in the hollow interior first and the fusible material in the first internal cavity softening second, the device can be configured with the fusible material softening in the first internal cavity first and the fusible material softening in the hollow interior second. For another example, more than three stages can be used by incorporating three or more extension segments.

While the invention has been described in connection with certain preferred embodiments, it is not intended to limit the spirit or scope of the invention to the particular forms set forth, but is intended to cover such alternatives, modifications, and equivalents as may be included within the true spirit and scope of the invention as defined by the appended claims.

What is claimed is:

1. A multi-stage temperature indicating device comprising:
   an elongate housing having a longitudinally extending bore formed therein having a closed end and an open end, said housing having a first neck region spaced from said closed end of said bore, a first internal cavity between said first neck region and said closed end of said bore, a second internal cavity between said first neck region and said open end;
   an indicator rod comprising a first stem stretch and a second stem stretch;
   an extension segment comprising a first extension stretch and a second extension stretch, the second extension stretch slidably cooperating with the first stem stretch;
   the indicator rod and the extension segment slidably positioned in said bore, the second stem stretch extending at least partially out of the housing;
   a spring urging said indicator rod upwardly through said open end of said bore; and
   a fusible material retaining said indicator rod and said extension segment in said housing, said fusible material being in solid form under normal conditions to retain said indicator rod in said housing and softening at an elevated temperature to release said indicator rod for upward movement relative to said housing,
   wherein a first portion of said fusible material retains said indicator rod in said housing and a second portion of said fusible material retains said extension segment in said housing,
   whereby the softening of the first portion of the fusible material allows the spring to urge the indicator rod a first distance out of the housing indicating that a first temperature has been reached and the softening of the second portion of the fusible material allows the spring to urge the indicator rod a second distance out of the housing indicating that a second temperature has been reached.

2. The multi-stage temperature indicating device as claimed in claim 1, wherein said first portion of said fusible material and said second portion of said fusible material soften at different predetermined temperatures.

3. The multi-stage temperature indicating device as claimed in claim 1, wherein the first stem stretch comprises a hollow interior structured to slidably accommodate at least a portion of the extension segment.

4. The multi-stage temperature indicating device as claimed in claim 3, wherein the fusible material fills the first internal cavity and a lower portion of the second internal cavity.

5. The multi-stage temperature indicating device as claimed in claim 4, wherein the fusible material engages:
   a front end portion of the first extension stretch to retain the extension segment in the first internal cavity; and
   a portion of the first stem stretch to retain the indicator rod in the lower portion of the second internal cavity.

6. The multi-stage temperature indicating device as claimed in claim 5, wherein when the device is heated:
   the fusible material in the lower portion of the second internal cavity softens first at a first time allowing the indicator rod to be urged a first distance out of the housing away from the closed end by the action of the spring; and
   the fusible material in the first internal cavity softens second at a second time allowing the first extension stretch to be urged out of the first internal cavity by the action of the spring, allowing the indicator rod to urged a second distance out of the housing away from the closed end by the action of the spring.

7. The multi-stage temperature indicating device as claimed in claim 6, wherein the front end portion of the first extension stretch is enlarged relative to the remainder of the first extension stretch and the portion of the first stem stretch engaging the fusible material is enlarged relative to at least another portion of the first stem stretch.

8. The multi-stage temperature indicating device as claimed in claim 3, wherein the fusible material fills the first internal cavity and at least a portion of the hollow interior of the first stem stretch.

9. The multi-stage temperature indicating device as claimed in claim 8, wherein the fusible material engages:
   a rear end portion of the second extension stretch to retain the extension segment in the hollow interior of the first stem stretch of the indicator rod;
   a front end portion of the first extension stretch to retain the extension segment in the first internal cavity,
   thereby retaining the indicator rod in the housing.

10. The multi-stage temperature indicating device as claimed in claim 9, wherein when the device is heated:
   the fusible material in the hollow interior of the first stem stretch softens first at a first time allowing the indicator rod to be urged away from the extension segment such that the second extension stretch is urged out of the hollow interior of the first stem stretch allowing the indicator rod to be urged a first distance out of the housing away from the closed end by the action of the spring; and
   the fusible material in the first internal cavity softens second at a second time allowing the first extension stretch to be urged at least partially out of the first internal cavity by the action of the spring, allowing the indicator rod to urged a second distance out of the housing away from the closed end by the action of the spring.

11. The multi-stage temperature indicating device as claimed in claim 10, wherein the front end portion of the first extension stretch is enlarged relative to at least a portion of the remainder of the first extension stretch and the rear end portion of the second extension stretch is enlarged relative to at least a portion of the remainder of the second extension stretch.

12. The multi-stage temperature indicating device as claimed in claim 1, wherein the second extension segment comprises a hollow interior structured to slidably accommodate at least a portion of the first stem stretch.

13. The multi-stage temperature indicating device as claimed in claim 12, wherein the fusible material fills the first internal cavity and at least a portion of the hollow interior of the second extension stretch.

14. The multi-stage temperature indicating device as claimed in claim 13, wherein the fusible material engages:
   a front end portion of the first extension stretch to retain the extension segment in the first internal cavity; and
   a portion of the first stem stretch to retain the first stem stretch in the hollow interior of the second extension stretch,
   thereby retaining the indicator rod in the housing.

15. The multi-stage temperature indicating device as claimed in claim 14, wherein when the device is heated:
   the fusible material in the hollow interior of the second extension stretch softens first at a first time allowing the indicator rod to be urged away from the extension segment such that the first stem stretch is urged out of the hollow interior of the second extension stretch allowing the indicator rod to be urged a first distance out of the housing away from the closed end by the action of the spring; and
   the fusible material in the first internal cavity softens second at a second time allowing the first extension stretch to be urged at least partially out of the first internal cavity by the action of the spring, allowing the indicator rod to urged a second distance out of the housing away from the closed end by the action of the spring.

16. The multi-stage temperature indicating device as claimed in claim 15, wherein the front end portion of the first extension stretch is enlarged relative to at least a portion of the remainder of the first extension stretch and a portion of the first stem stretch is enlarged relative to at least another portion of the remainder of the first stem stretch.

17. A multi-stage temperature indicating device comprising:
   a housing having a bore formed therein having a closed end and an open end, the housing having a first neck region spaced from the closed end, a first internal cavity between the first neck region and the closed end, a second internal cavity between the first neck region and the open end;
   an indicator rod comprising a first stem stretch and a second stem stretch;
   an extension segment having a first extension stretch and a second extension stretch, the second extension stretch slidably cooperating with the first stem stretch;
   the indicator rod and the extension segment slidably positioned in the bore; and
   a fusible material retaining the indicator rod and the extension segment in the housing,
   wherein different portions of the fusible material soften at different temperatures,
   whereby the softening of a first portion of the fusible material allows a spring to urge the indicator rod a first distance out of the housing indicating that a first temperature has been reached and the softening of a second portion of the fusible material allows the spring to urge the indicator rod a second distance out of the housing indicating that a second temperature has been reached.

18. The multi-stage temperature indicating device as claimed in claim 17, wherein said first portion of said fusible material and said second portion of said fusible material soften at different predetermined temperatures.

19. The multi-stage temperature indicating device as claimed in claim 17, wherein:
   the first stem stretch comprises a hollow interior structured to slidably accommodate at least a portion of the extension segment;
   the fusible material fills the first internal cavity and a lower portion of the second internal cavity; and
   the fusible material engages
      a front end portion of the first extension stretch to retain the extension segment in the first internal cavity; and
      a portion of the first stem stretch to retain the indicator rod in the lower portion of the second internal cavity.

20. The multi-stage temperature indicating device as claimed in claim 19, wherein when the device is heated:
   the fusible material in the lower portion of the second internal cavity softens first at a first time allowing the indicator rod to be urged a first distance out of the housing away from the closed end by the action of the spring; and
   the fusible material in the first internal cavity softens second at a second time allowing the first extension stretch to be urged out of the first internal cavity by the action of the spring, allowing the indicator rod to urged a second distance out of the housing away from the closed end by the action of the spring.

21. The multi-stage temperature indicating device as claimed in claim 20, wherein the front end portion of the first extension stretch is enlarged relative to the remainder of the first extension stretch and the portion of the first stem stretch engaging the fusible material is enlarged relative to at least another portion of the first stem stretch.

22. The multi-stage temperature indicating device as claimed in claim 17, wherein:
   the first stem stretch comprises a hollow interior structured to slidably accommodate at least a portion of the extension segment;
   the fusible material fills the first internal cavity and at least a portion of the hollow interior of the first stem stretch; and
   the fusible material engages:
      a rear end portion of the second extension stretch to retain the extension segment in the hollow interior of the first stem stretch of the indicator rod;
      a front end portion of the first extension stretch to retain the extension segment in the first internal cavity,
      thereby retaining the indicator rod in the housing.

23. The multi-stage temperature indicating device as claimed in claim 22, wherein when the device is heated:
   the fusible material in the hollow interior of the first stem stretch softens first at a first time allowing the indicator rod to be urged away from the extension segment such that the second extension stretch is urged out of the hollow interior of the first stem stretch allowing the indicator rod to be urged a first distance out of the housing away from the closed end by the action of the spring; and
   the fusible material in the first internal cavity softens second at a second time allowing the first extension stretch to be urged at least partially out of the first internal cavity by the action of the spring, allowing the indicator rod to urged a second distance out of the housing away from the closed end by the action of the spring.

24. The multi-stage temperature indicating device as claimed in claim 17, wherein:
   the second extension segment comprises a hollow interior structured to slidably accommodate at least a portion of the first stem stretch;
   the fusible material fills the first internal cavity and at least a portion of the hollow interior of the second extension stretch; and
   the fusible material engages:
      a front end portion of the first extension stretch to retain the extension segment in the first internal cavity; and
      a portion of the first stem stretch to retain the first stem stretch in the hollow interior of the second extension stretch,
      thereby retaining the indicator rod in the housing.

25. The multi-stage temperature indicating device as claimed in claim 24, wherein when the device is heated:
   the fusible material in the hollow interior of the second extension stretch softens first at a first time allowing the indicator rod to be urged away from the extension segment such that the first stem stretch is urged out of the hollow interior of the second extension stretch allowing the indicator rod to be urged a first distance out of the housing away from the closed end by the action of the spring; and
   the fusible material in the first internal cavity softens second at a second time allowing the first extension stretch to be urged at least partially out of the first internal cavity by the action of the spring, allowing the indicator rod to urged a second distance out of the housing away from the closed end by the action of the spring.

26. The multi-stage temperature indicating device as claimed in claim 25, wherein the front end portion of the first extension stretch is enlarged relative to at least a portion of the remainder of the first extension stretch and a portion of the first stem stretch is enlarged relative to at least another portion of the remainder of the first stem stretch.

27. The multi-stage temperature indicating device as claimed in claim 26, wherein the front end portion of the first extension stretch is enlarged relative to at least a portion of the remainder of the first extension stretch and the rear end portion of the second extension stretch is enlarged relative to at least a portion of the remainder of the second extension stretch.

28. The multi-stage temperature indicating device as claimed in claim 1 or 17, comprising at least one additional extension segment for cooperating with said indicator rod and said extension segment whereby the indicator rod can be urged out of said housing at least a third distance indicating that at least a third temperature has been reached.

29. The multi-stage temperature indicating device as claimed in claim 1 or 17, wherein said second stem stretch of said indicating rod comprises visual indicators for indicating when each of the first temperature and the second temperature have been reached.

30. The multi-stage temperature indicating device as claimed in claim 29, wherein a first of the visual indicators extends out of the housing when the first temperature has been reached and a second of the visual indicators extends out of the housing when the second temperature has been reached.

* * * * *